United States Patent
Uchida

(10) Patent No.: US 12,406,530 B2
(45) Date of Patent: Sep. 2, 2025

(54) IDENTIFICATION DEVICE FOR USER IDENTIFICATION BASED ON ANALYSIS OF A THREE-DIMENSIONAL IMAGE AND DATA RELATED TO AN EYEBALL OF THE USER

(71) Applicant: CANON KABUSHIKI KAISHA, Tokyo (JP)

(72) Inventor: Takeshi Uchida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 348 days.

(21) Appl. No.: 17/969,041

(22) Filed: Oct. 19, 2022

(65) Prior Publication Data

US 2023/0128281 A1     Apr. 27, 2023

(30) Foreign Application Priority Data

Oct. 25, 2021   (JP) ................................. 2021-173758

(51) Int. Cl.
| | | |
|---|---|---|
| *G06V 40/18* | (2022.01) | |
| *G06F 3/01* | (2006.01) | |
| *G06F 21/32* | (2013.01) | |
| *G06T 7/64* | (2017.01) | |
| *G06V 10/141* | (2022.01) | |
| *G06V 10/74* | (2022.01) | |

(52) U.S. Cl.
CPC ............ *G06V 40/197* (2022.01); *G06F 3/013* (2013.01); *G06F 21/32* (2013.01); *G06T 7/64* (2017.01); *G06V 10/141* (2022.01); *G06V 10/761* (2022.01)

(58) Field of Classification Search
CPC .. G06V 40/197; G06V 10/141; G06V 10/761; G06T 7/64; G06F 3/013; G06F 21/32
See application file for complete search history.

(56) References Cited

U.S. PATENT DOCUMENTS

2017/0344110 A1* 11/2017 Yoshioka et al. ......... G06F 3/01

FOREIGN PATENT DOCUMENTS

| JP | 08-504979 A | 5/1996 | |
|---|---|---|---|
| JP | 11-7535 A | 1/1999 | |
| JP | 4452833 B2 * | 4/2010 | ............ A61B 3/113 |
| JP | 2018514046 A | 5/2018 | |

(Continued)

OTHER PUBLICATIONS

The above foreign patent documents were cited in the Jul. 1, 2025 Japanese Office Action, enclosed without an English Translation, that issued in Japanese Patent Application No. 2021-173758.

*Primary Examiner* — Vu Le
*Assistant Examiner* — Matthew James Bodnark
(74) *Attorney, Agent, or Firm* — Cowan, Liebowitz & Latman, P.C.

(57) ABSTRACT

An identification device according to the present invention includes at least one memory and at least one processor which function as: an image acquisition unit configured to acquire an image obtained by capturing an eyeball of a user; an information acquisition unit configured to acquire three-dimensional information of the eyeball, based on the image; and an identification unit configured to identify the user, based on the three-dimensional information.

19 Claims, 16 Drawing Sheets

(56) References Cited

FOREIGN PATENT DOCUMENTS

| | | | | |
|---|---|---|---|---|
| JP | 2018128749 A | | 8/2018 | |
| JP | 2020048695 A | * | 4/2020 | ............... A61B 3/10 |
| KR | 20180102637 A | * | 9/2018 | ............. G06V 40/45 |
| WO | WO2016161481 A1 | * | 10/2016 | ............. G06F 21/00 |
| WO | 2017013913 A | | 1/2017 | |
| WO | WO2020026574 A1 | * | 2/2020 | ............. A61B 3/113 |

* cited by examiner

FIG. 8

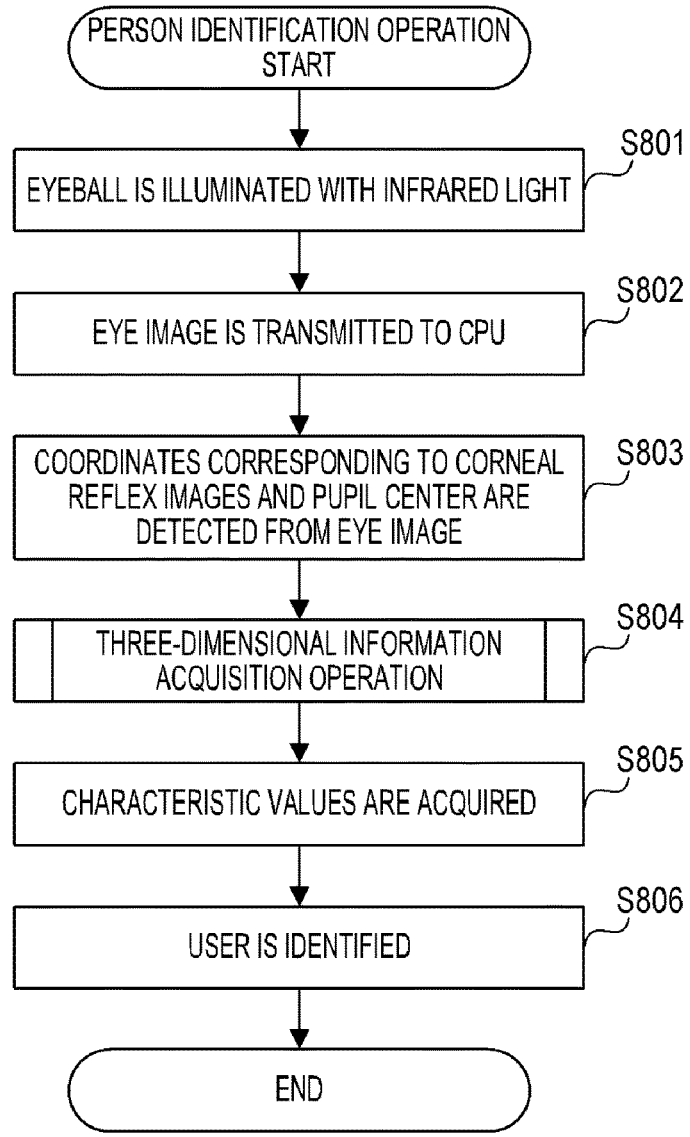

```
PERSON IDENTIFICATION OPERATION START
        ↓
EYEBALL IS ILLUMINATED WITH INFRARED LIGHT — S801
        ↓
EYE IMAGE IS TRANSMITTED TO CPU — S802
        ↓
COORDINATES CORRESPONDING TO CORNEAL
REFLEX IMAGES AND PUPIL CENTER ARE
DETECTED FROM EYE IMAGE — S803
        ↓
THREE-DIMENSIONAL INFORMATION
ACQUISITION OPERATION — S804
        ↓
CHARACTERISTIC VALUES ARE ACQUIRED — S805
        ↓
USER IS IDENTIFIED — S806
        ↓
       END
```

FIG. 9

| REGISTRATION NUMBER | CHARACTERISTIC VALUE | PERSON NAME |
|---|---|---|
| 1 | CHARACTERISTIC VALUE 1 | A |
| 2 | CHARACTERISTIC VALUE 2 | B |
| 3 | CHARACTERISTIC VALUE 3 | C |
| 4 | CHARACTERISTIC VALUE 4 | D |
| 5 | CHARACTERISTIC VALUE 5 | E |
| 6 | CHARACTERISTIC VALUE 6 | F |

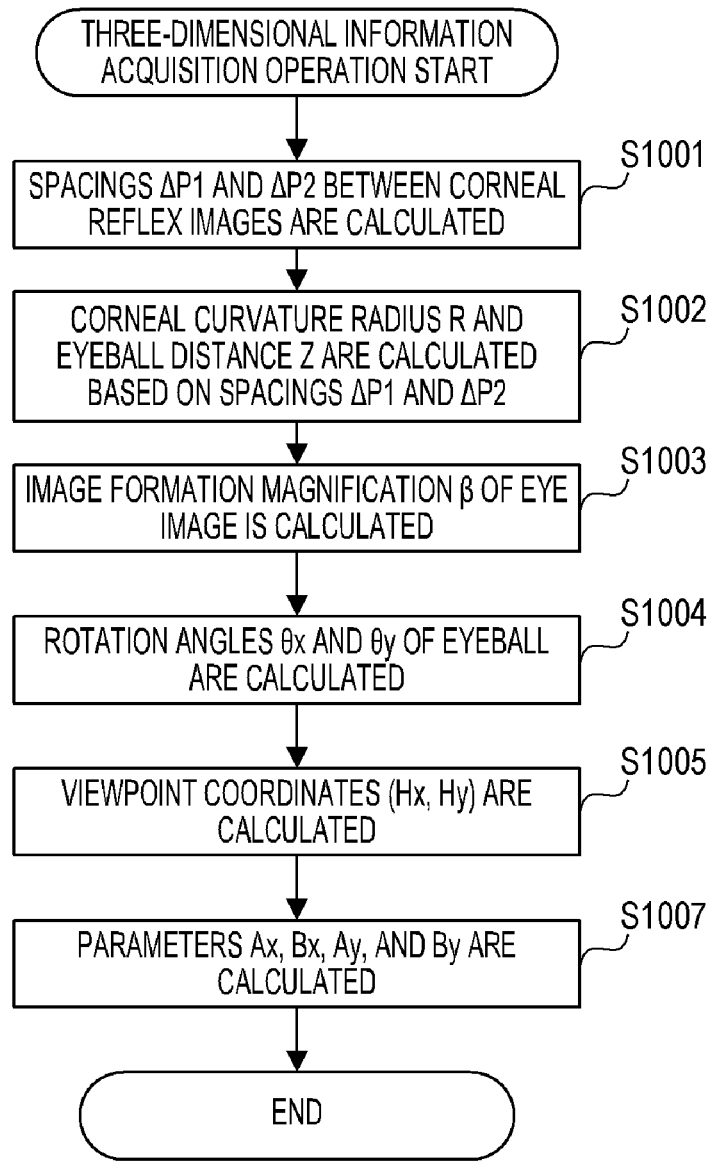

IDENTIFICATION DEVICE FOR USER IDENTIFICATION BASED ON ANALYSIS OF A THREE-DIMENSIONAL IMAGE AND DATA RELATED TO AN EYEBALL OF THE USER

BACKGROUND OF THE INVENTION

Field of the Invention

The present invention relates to an identification device for identifying a person.

Description of the Related Art

A method for identifying a person on the basis of an iris portion has been proposed as a method for identifying (authenticating) a person on the basis of a face image of the person taken by a camera. For example, Japanese Translation of PCT Application No. H08-504979 proposes a method for identifying a person by extracting an iris portion from an image of a person's eye (eyeball), coding the iris portion, and comparing the code of the iris portion with a reference code. Japanese Patent Application Publication No. H11-007535 proposes a method for improving the success rate of identification based on an iris portion by further using additional information.

However, in the techniques disclosed in Japanese Translation of PCT Application No. H08-504979 and Japanese Patent Application Publication No. H11-007535, a person is identified based on a two-dimensional iris pattern (iris pattern). Therefore, impersonation based on using contact lenses with an iris pattern printed thereon, eye video, and the like is possible. In other words, a person cannot be identified with high accuracy. In a case where an imaging element that can obtain a high-resolution image (an image with a large number of pixels) as an eye image, or a high-performance CPU or the like having a speed of computation that can handle high-resolution images is used, a person can be identified with high accuracy based on a two-dimensional iris pattern, but the cost will increase.

SUMMARY OF THE INVENTION

The present invention provides a technique capable of identifying (authenticating) a user (person) with high accuracy and with a simple configuration.

The present invention in its first aspect provides an identification device including at least one memory and at least one processor which function as: an image acquisition unit configured to acquire an image obtained by capturing an eyeball of a user; an information acquisition unit configured to acquire three-dimensional information of the eyeball, based on the image; and an identification unit configured to identify the user, based on the three-dimensional information.

The present invention in its second aspect provides a control method of an identification device, including: acquiring an image obtained by capturing an eyeball of a user; acquiring three-dimensional information of the eyeball, based on the image; and identifying the user, based on the three-dimensional information.

The present invention in its third aspect provides a non-transitory computer readable medium that stores a program, wherein the program causes a computer to execute a control method of an identification device, the control method comprising: acquiring an image obtained by capturing an eyeball of a user; acquiring three-dimensional information of the eyeball, based on the image; and identifying the user, based on the three-dimensional information.

Further features of the present invention will become apparent from the following description of exemplary embodiments with reference to the attached drawings.

BRIEF DESCRIPTION OF THE DRAWINGS

FIG. 8 is a flowchart of a person identification operation according to the present embodiment;

FIG. 9 is a correspondence table of characteristic values and persons according to the present embodiment;

FIG. 10 is a flowchart of a three-dimensional information acquisition operation according to the present embodiment;

DESCRIPTION OF THE EMBODIMENTS

Figure 1A:
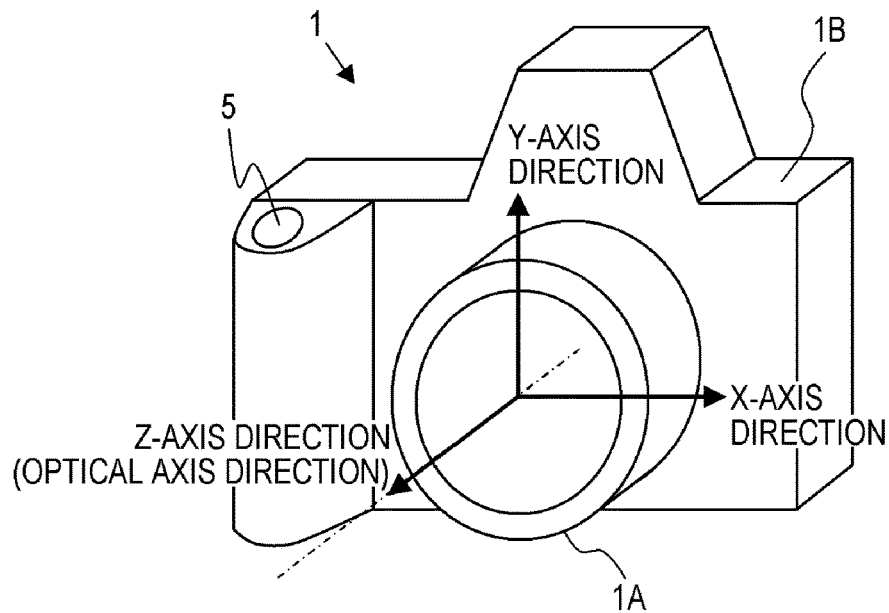
FIGS. 1A and 1B are external views of a camera according to the present embodiment.
Figure 1B:
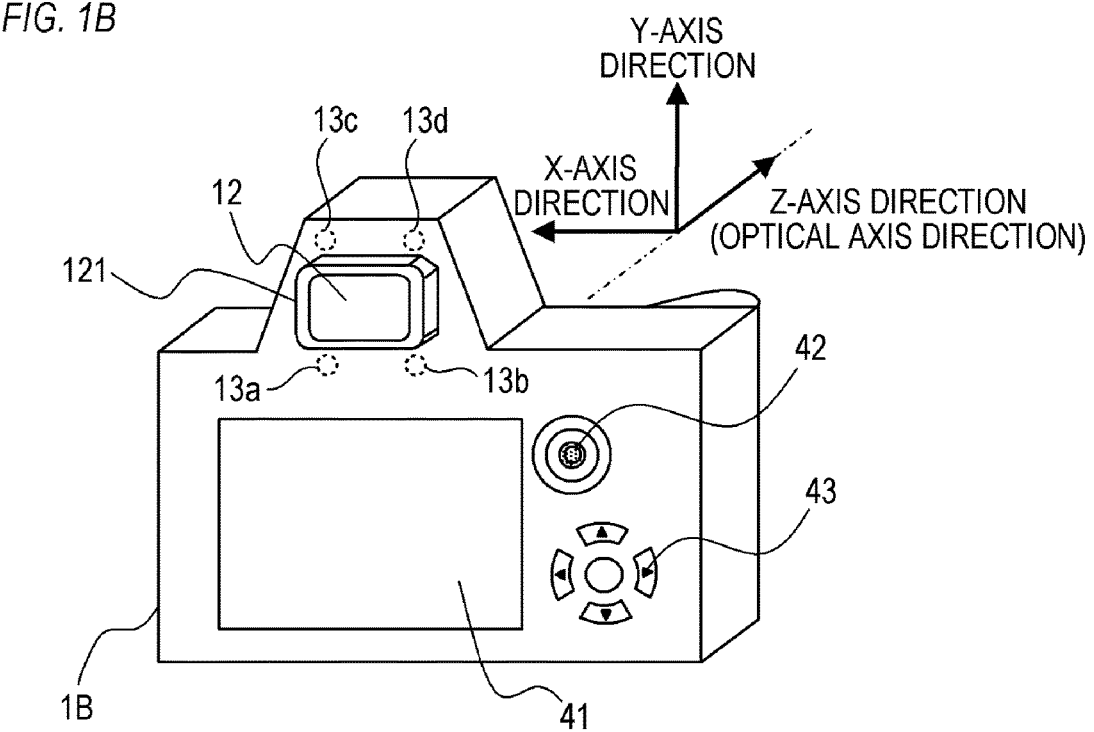

Hereinafter, embodiments of the present invention will be described with reference to the accompanying drawings.
Explanation of Configuration FIGS. 1A and 1B show the external appearance of a camera 1 (digital still camera; interchangeable lens camera) according to the present embodiment. Although the details will be described hereinbelow, the camera 1 has a function of acquiring information on an eyeball of a user (person) and a function of identifying (authenticating) the user (person). FIG. 1A is a front perspective view, and FIG. 1B is a rear perspective view. As shown in FIG. 1A, the camera 1 has an imaging lens unit 1A and a camera housing 1B. A release button 5 which is an operation member for receiving an imaging operation from a user (a photographer) is arranged on the camera housing 1B. As shown in FIG. 1B, an eyepiece window frame 121 and an eyepiece lens 12 for the user to look into a below-described display device 10

(display panel) included in the camera housing 1B are arranged on the back surface of the camera housing 1B. Operation members 41 to 43 that receive various operations from the user are also arranged on the back surface of the camera housing 1B. For example, the operation member 41 is a touch panel that receives touch operations, the operation member 42 is an operation lever that can be pushed in each direction, and the operation member 43 is a four-direction key that can be pushed in each of the four directions. The operation member 41 (touch panel) includes a display panel such as a liquid crystal panel and has a function of displaying an image on the display panel. In addition, four light sources 13a to 13d that illuminate the user's eyeball are provided around the eyepiece lens 12.

Figure 2:
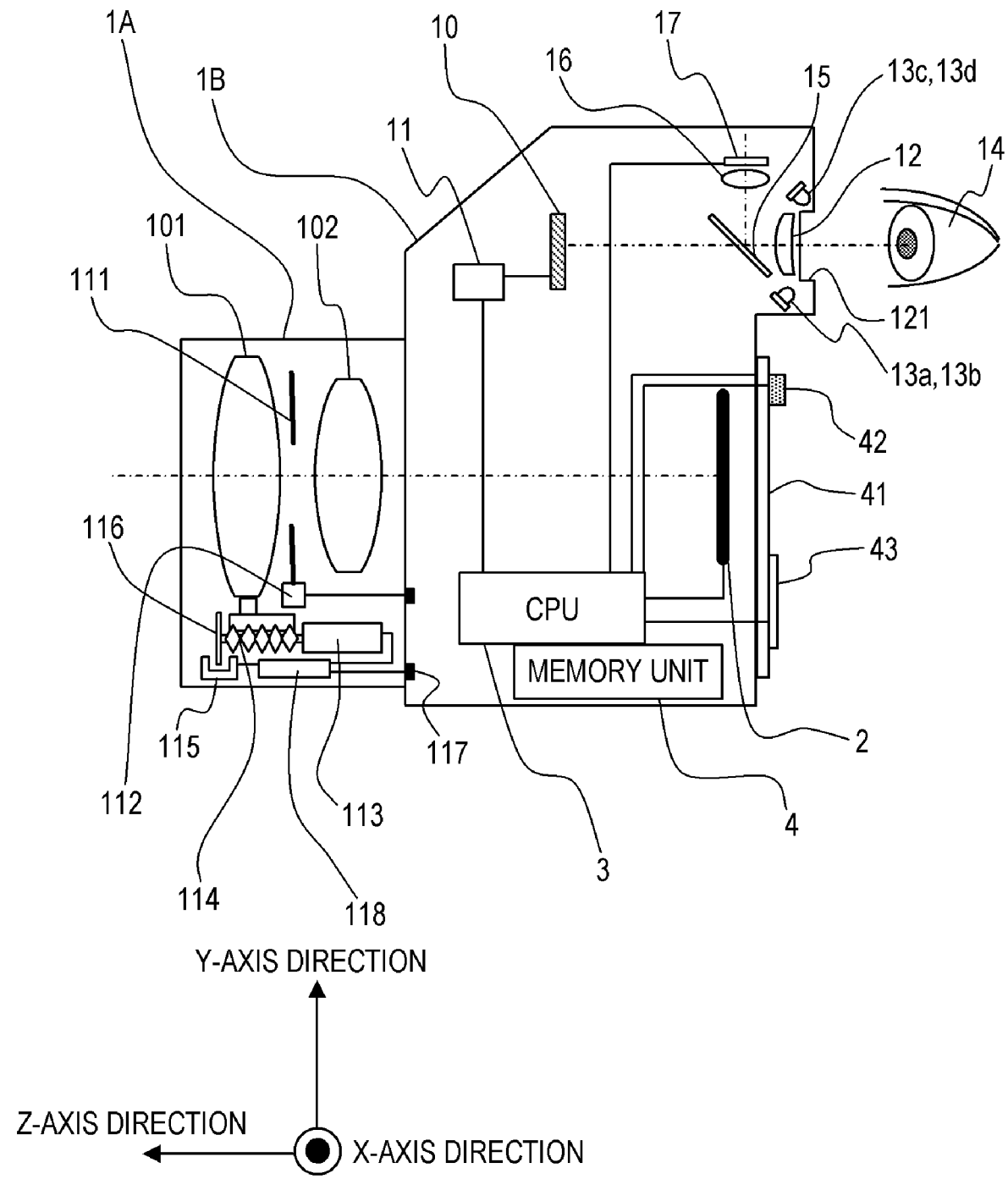
FIG. 2 is a cross-sectional view of the camera according to the present embodiment.

FIG. 2 is a cross-sectional view of the camera 1 taken along the YZ plane formed by the Y-axis and the Z-axis shown in FIG. 1A and shows a general internal configuration of the camera 1.

Two lenses 101 and 102, an aperture 111, an aperture drive unit 112, a lens drive motor 113, a lens drive member 114, a photocoupler 115, a pulse plate 116, a mount contact 117, a focus adjustment circuit 118, and the like are included in the imaging lens unit 1A. The lens drive member 114 is composed of a drive gear or the like, and the photocoupler 115 detects the rotation of the pulse plate 116 linked to the lens drive member 114 and transmits the detection result to a focus adjustment circuit 118. The focus adjustment circuit 118 drives the lens drive motor 113 based on the information from the photocoupler 115 and the information from the camera housing 1B (information on lens drive amount) and moves the lens 101 to change the focus position. The mount contact 117 is an interface between the imaging lens unit 1A and the camera housing 1B. Although two lenses 101 and 102 are shown for simplicity, more than two lenses are actually included in the imaging lens unit 1A.

The camera housing 1B includes an imaging element 2, a CPU 3, a memory unit 4, a display device 10, a display device drive circuit 11, and the like. The imaging element 2 is arranged on the planned image plane of the imaging lens unit 1A. The CPU 3 is a central processing unit of the microcomputer and controls the entire camera 1. The memory unit 4 stores an image or the like captured by the imaging element 2. The display device 10 is configured of a liquid crystal display or the like, and displays a captured image (object image) or the like on the screen (display surface) of the display device 10. The display device drive circuit 11 drives the display device 10. The user can see the screen of the display device 10 through the eyepiece window frame 121 and the eyepiece lens 12.

The camera housing 1B also includes light sources 13a to 13d, an optical divider 15, a light-receiving lens 16, an eye imaging element 17, and the like. The light sources 13a to 13d are the light sources that are conventionally used in a single-lens reflex camera or the like for detecting the line of sight from the relationship between the reflected image (corneal reflex image) due to the corneal reflection of light and the pupil, and serve for illuminating the user's eyeball 14. Specifically, the light sources 13a to 13d are infrared light-emitting diodes or the like that emit infrared light that is insensitive to the user, and are arranged around the eyepiece lens 12. The optical image of the illuminated eyeball 14 (eyeball image; an image created by light emitted from the light sources 13a to 13d and reflected by the eyeball 14) passes through the eyepiece lens 12 and is reflected by the optical divider 15. Then, the eyeball image is formed by the light-receiving lens 16 on the eye imaging element 17 in which rows of photoelectric elements such as a CCD or CMOS are two-dimensionally arranged. The light-receiving lens 16 positions the pupil of the eyeball 14 and the eye imaging element 17 in a conjugate image forming relationship. The line of sight of the eyeball 14 is detected from the position of the corneal reflex image in the eyeball image formed on the eye imaging element 17 by a predetermined algorithm described hereinbelow. Specifically, the line-of-sight direction (direction of the line of sight), the viewpoint on the screen of the display device 10 (the position on which the line of sight fell), and the like can be obtained as information on the line of sight. The viewpoint can also be ascertained as the position at which the user is looking or the position of the line of sight.

Figure 3:
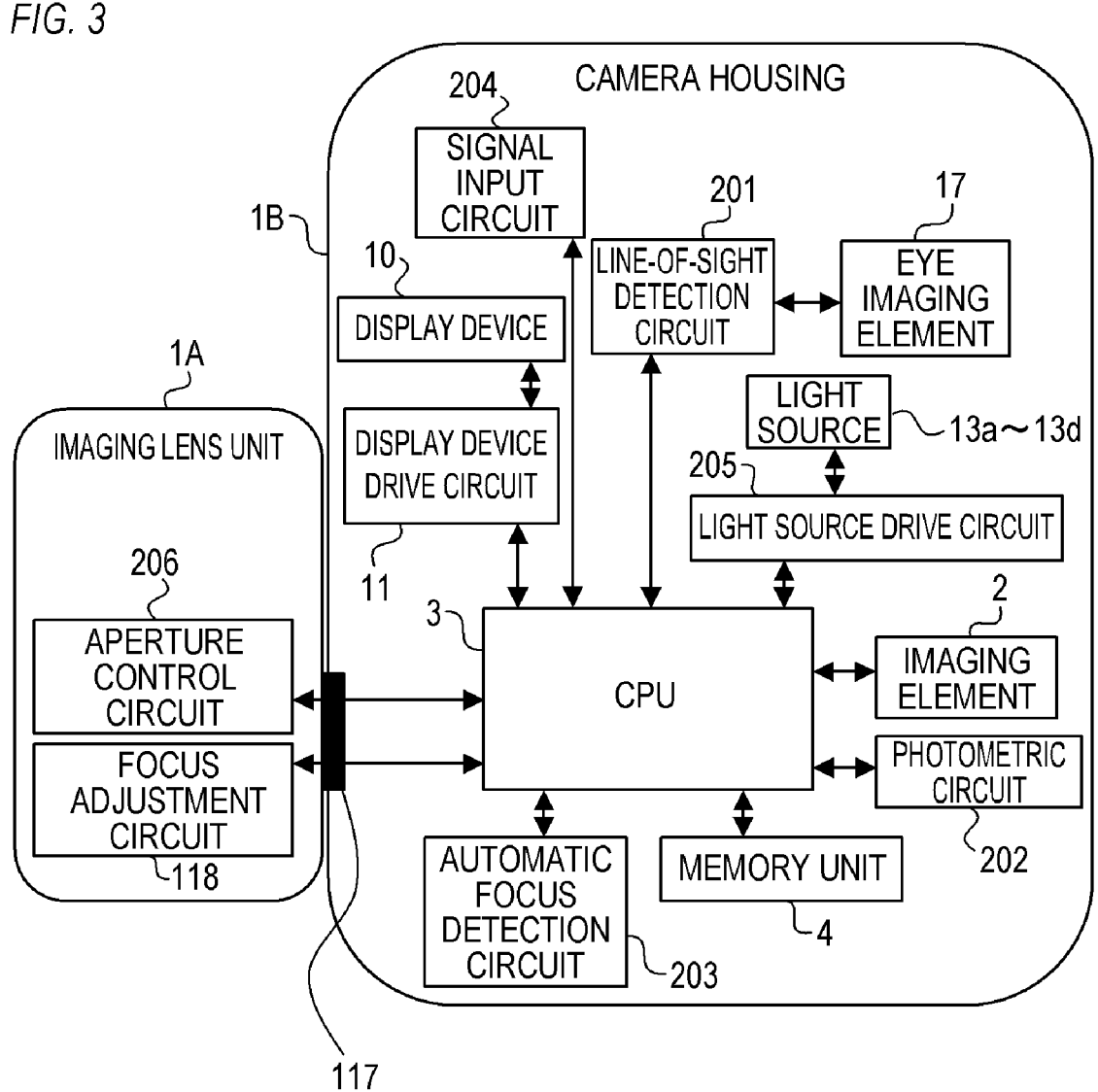
FIG. 3 is a block diagram of the camera according to the present embodiment.

FIG. 3 is a block diagram showing an electrical configuration inside the camera 1. A line-of-sight detection circuit 201, a photometric circuit 202, an automatic focus detection circuit 203, a signal input circuit 204, the display device drive circuit 11, a light source drive circuit 205, and the like are connected to a CPU 3. Further, the CPU 3 transmits a signal to the focus adjustment circuit 118 arranged in the imaging lens unit 1A and an aperture control circuit 206 included in the aperture drive unit 112 in the imaging lens unit 1A through the mount contact 117. The memory unit 4 provided together with the CPU 3 has a function of storing imaging signals from the imaging element 2 and the eye imaging element 17, and a function of storing a line-of-sight correction parameter for correcting individual differences in the line of sight, which will be described hereinbelow.

The line-of-sight detection circuit 201 performs A/D conversion of the output (eye image obtained by capturing (imaging) the eye (eyeball 14)) of the eye imaging element 17 in a state where the eyeball image is formed on the eye imaging element 17 (CCD-EYE) and transmits the conversion result to the CPU 3. The CPU 3 extracts the characteristic points required for the line-of-sight detection from the eye image according to a below-described predetermined algorithm and detects the user's line of sight from the positions of the characteristic points.

The photometric circuit 202 performs amplification, logarithmic compression, A/D conversion, and the like of a signal obtained from the imaging element 2 that also serves as a photometric sensor, specifically, a brightness signal corresponding to the lightness of the field, and sends the results thereof to the CPU 3 as the field brightness information.

The automatic focus detection circuit 203 performs A/D conversion of signal voltages from a plurality of detection elements (a plurality of pixels), which is included in the CCD in the imaging element 2 and used for phase difference detection, and sends the converted voltages to the CPU 3. The CPU 3 calculates the distance to the object corresponding to each focus detection point from the signals of the plurality of detection elements. This is a technique known as imaging surface phase-difference AF. In the present embodiment, as an example, it is assumed that there is a focus detection point at each of the 180 locations on the imaging surface corresponding to the 180 locations shown in the field-of-view image in a finder (screen of the display device 10) of FIG. 4A.

A switch SW1 and a switch SW2 are connected to the signal input circuit 204. The switch SW1 is switched ON by the first stroke of the release button 5 and serves to start the photometry, range finding, line-of-sight detection operation, and the like of the camera 1, and the switch SW2 is switched ON by the second stroke of the release button 5 and serves to start the imaging operation. The ON signals from the switches SW1 and SW2 are input to the signal input circuit 204 and transmitted to the CPU 3.

The light source drive circuit 205 drives the light sources 13a to 13d.

Figure 4A:
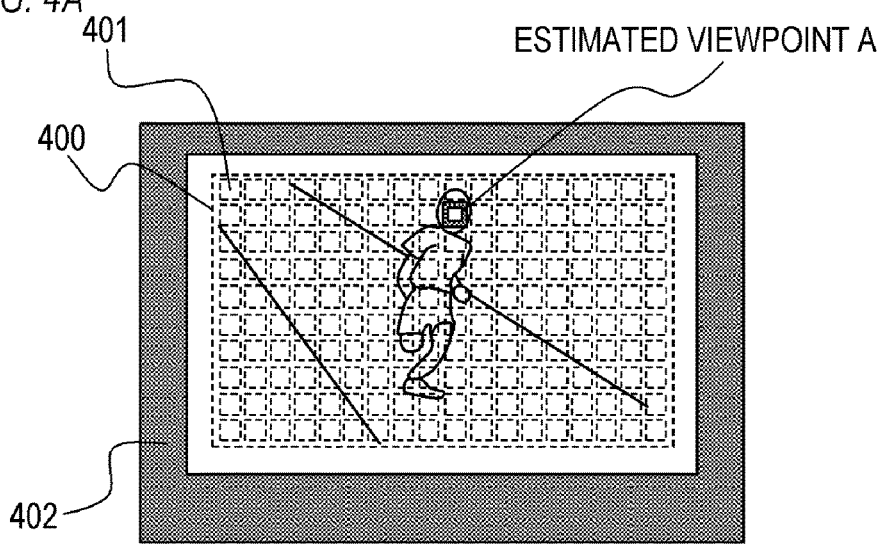
FIGS. 4A to 4C show the field of view in a finder according to the present embodiment.

FIG. 4A shows the field of view in the finder and shows a state in which the display device 10 is operating (a state in which an image is displayed). As shown in FIG. 4A, the field of view in the finder includes a focus detection region 400, 180 rangefinder point indexes 401, a field-of-view mask 402, and the like. Each of the 180 rangefinder point indexes 401 is displayed superimposed on a through image (live view image) displayed on the display device 10 so as to be displayed at a position corresponding to the focus detection point on the imaging surface. Further, of the 180 rangefinder point indexes 401, the rangefinder point index 401 corresponding to the current viewpoint A (estimated position) is displayed while being highlighted by a frame or the like.

Explanation of Person Identification Operation

Figure 5:
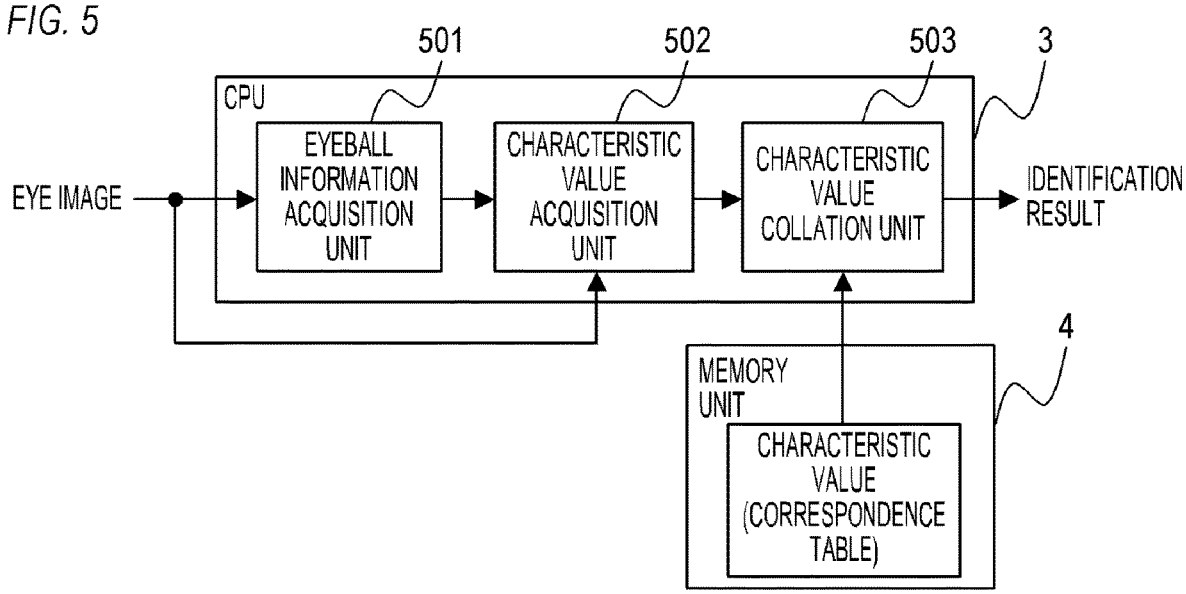
FIG. 5 is a block diagram of a CPU according to the present embodiment.
Figure 6:
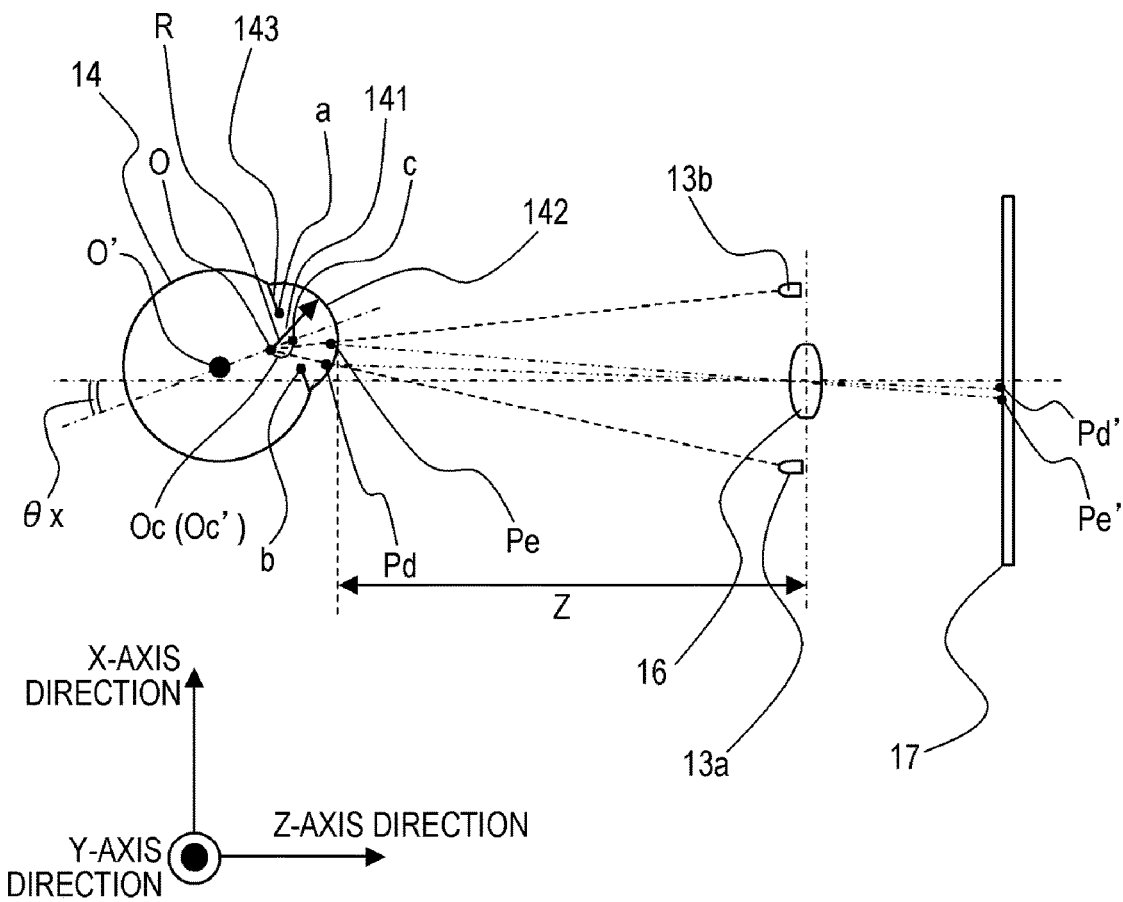
FIG. 6 shows an optical system according to the present embodiment.
Figure 7A:
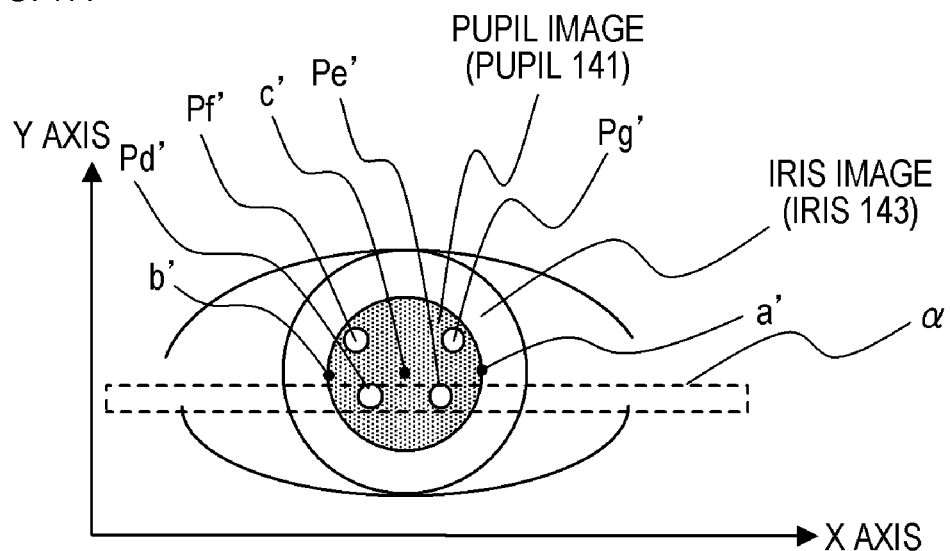
FIG. 7A shows an eye image according to the present embodiment.
Figure 7B:
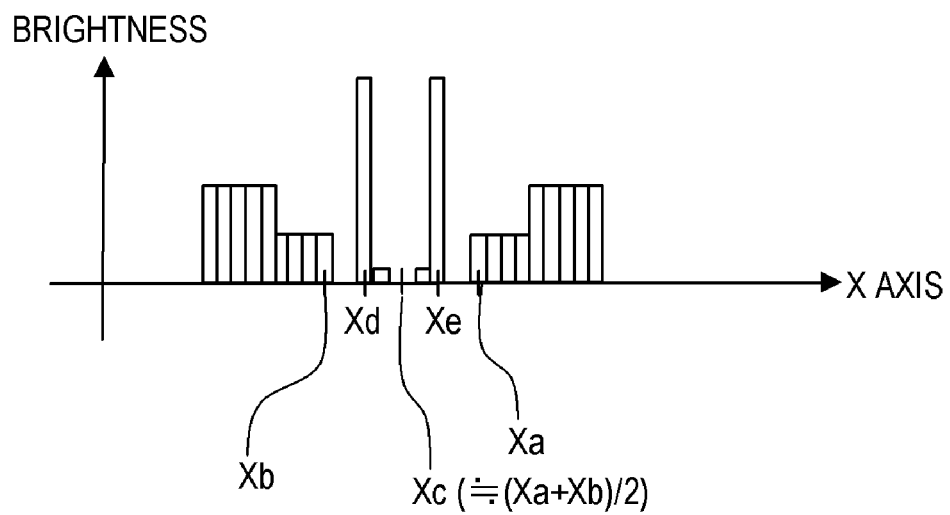
FIG. 7B shows the brightness distribution of the eye image according to the present embodiment.

The person identification operation for identifying a user will be described with reference to FIGS. 5 to 9. Although the details will be described hereinbelow, in the present embodiment, it is assumed that the person identification operation includes the line-of-sight detection operation. FIG. 5 is a block diagram showing functional units required for the person identification operation. An eyeball information acquisition unit 501, a characteristic value acquisition unit 502, and a characteristic value collation unit 503 shown in FIG. 5 are realized by the CPU 3. FIG. 6 is a schematic view of an optical system for performing the person identification operation. As shown in FIG. 6, the light sources 13a and 13b are arranged substantially symmetrically with respect to the optical axis of the light-receiving lens 16 and illuminate the user's eyeball 14. A part of the light emitted from the light sources 13a and 13b and reflected by the eyeball 14 is focused on the eye imaging element 17 by the light-receiving lens 16. Similarly, the light sources 13c and 13d are arranged substantially symmetrically with respect to the optical axis of the light-receiving lens 16 and illuminate the user's eyeball 14. A part of the light emitted from the light sources 13c and 13d and reflected by the eyeball 14 is focused on the eye imaging element 17 by the light-receiving lens 16. FIG. 7A is a schematic view of an eye image (eyeball image projected on the eye imaging element 17) captured by the eye imaging element 17, and FIG. 7B shows the output intensity of the CCD in the eye imaging element 17. FIG. 8 shows a schematic flowchart of the person identification operation. FIG. 9 is a table (correspondence table) showing the correspondence relationship between the characteristic value and the person.

When the person identification operation starts, in step S801 of FIG. 8, the light sources 13a to 13d emit infrared light toward the user's eyeball 14. The user's eyeball image illuminated by infrared light is formed on the eye imaging element 17 through the light-receiving lens 16 and photoelectrically converted by the eye imaging element 17. As a result, a processable electrical signal of eye image can be obtained (eye image acquisition).

In step S802, the line-of-sight detection circuit 201 sends the eye image (eye image signal; electrical signal of eye image) obtained from the eye imaging element 17 to the CPU 3.

In steps S803 and S804, the eyeball information acquisition unit 501 realized by the CPU 3 acquires the three-dimensional information on the user's eyeball 14 on the basis of the eye image obtained in step S802.

In step S803, the eyeball information acquisition unit 501 finds the coordinates of points corresponding to the corneal reflex images Pd, Pe, Pf, and Pg of the light sources 13a to 13d and the pupil center c (the center of the pupil 141) from the eye image obtained in step S802.

Infrared light emitted from the light sources 13a to 13d illuminates the cornea 142 of the user's eyeball 14. At this time, the corneal reflex images Pd, Pe, Pf, and Pg formed by a part of the infrared light reflected on the surface of the cornea 142 are condensed by the light-receiving lens 16 and formed on the eye imaging element 17 to obtain corneal reflex images Pd', Pe', Pf, and Pg' in the eye image. Similarly, the luminous fluxes from the ends a and b of the pupil 141 also form images on the eye imaging element 17 to become the pupil end images a' and b' in the eye image.

FIG. 7B shows the brightness information (brightness distribution) of a region a in the eye image of FIG. 7A. In FIG. 7B, the horizontal direction of the eye image is an X-axis direction, the vertical direction is an Y-axis direction, and the brightness distribution in the X-axis direction is shown. In the present embodiment, the coordinates of the corneal reflex images Pd' and Pe' in the X-axis direction (horizontal direction) are Xd and Xe, and the coordinates of the pupil end images a' and b' in the X-axis direction are Xa and Xb. As shown in FIG. 7B, at the coordinates Xd and Xe of the corneal reflex images Pd' and Pe', an extremely high level of brightness can be obtained. In the region from the coordinate Xa to the coordinate Xb, which corresponds to the region of the pupil 141 (the region of the pupil image obtained as a result of the luminous fluxes from the pupil 141 forming images on the eye imaging element 17), an extremely low level of brightness is obtained, excluding the coordinates Xd and Xe. In the region of an iris 143 outside the pupil 141 (the region of an iris image outside the pupil image, which is obtained as a result of a luminous flux from the iris 143 forming an image), a brightness intermediate between the above two types of brightness can be obtained. Specifically, in a region where the X coordinate (coordinate in the X-axis direction) is smaller than the coordinate Xa and in a region where the X coordinate is larger than the coordinate Xb, a brightness intermediate between the above two types of brightness can be obtained.

From the brightness distribution such as shown in FIG. 7B, the X-coordinates Xd and Xe of the corneal reflex images Pd' and Pe' and the X-coordinates Xa and Xb of the pupil end images a' and b' can be obtained. Specifically, the coordinates with extremely high brightness can be obtained as the coordinates of the corneal reflex images Pd' and Pe', and the coordinates with extremely low brightness can be obtained as the coordinates of the pupil end images a' and b'. Further, when the rotation angle θx of the optical axis of the eyeball 14 with respect to the optical axis of the light-receiving lens 16 is small, the X-coordinate Xc of the pupil center image c' (center of the pupil image) obtained as a result of the light flux from the pupil center c forming an image on the eye imaging element 17 can be expressed as Xc≅(Xa+Xb)/2. That is, the X-coordinate Xc of the pupil center image c' can be calculated from the X-coordinates Xa and Xb of the pupil edge images a' and b'. In this way, the coordinates of the corneal reflex images Pd' and Pe' and the coordinates of the pupil center image c' can be estimated. The coordinates of the corneal reflex images Pf and Pg' can be estimated in the same manner.

Returning to the explanation in FIG. 8, in step S804, the eyeball information acquisition unit 501 acquires three-dimensional information on the user's eyeball 14 on the basis of the coordinates of the corneal reflex images Pd', Pe', Pf, and Pg' (three-dimensional information acquisition operation). In the present embodiment, it is assumed that the three-dimensional information includes information on the surface shape of the eyeball 14 and information on the internal structure of the eyeball 14. The information on the surface shape of the eyeball 14 is, for example, information on a corneal curvature radius R (corneal curvature radius 142) shown in FIG. 6. The information on the internal structure of the eyeball 14 includes, for example, information on the amount of displacement of the photoreceptor cell of the eyeball 14 from the optical axis passing through the pupil center c and the corneal curvature center O (corneal curvature center 142), and information on the distance between the pupil center c and the corneal curvature center O, and the like. The three-dimensional information may include all of these multiple types of information or may not include at least one thereof.

In steps S805 and S806, the CPU 3 identifies the user on the basis of the three-dimensional information obtained in step S805.

In step S805, the characteristic value acquisition unit 502 realized by the CPU 3 acquires the characteristic value for identifying the user on the basis of the eye image obtained in step S802 and the three-dimensional information obtained in step S804.

In step S806, the characteristic value collation unit 503 realized by the CPU 3 compares the characteristic value obtained in step S805 with the characteristic value recorded in advance in the memory unit 4 to identify the user. Then, the characteristic value collation unit 503 outputs the identification result. For example, a correspondence table of FIG. 9 is recorded in advance in the memory unit 4. The characteristic value collation unit 503 selects the characteristic value having the highest degree of agreement with the characteristic value obtained in step S805 from the plurality of characteristic values shown in the correspondence table of FIG. 9, and a person associated with the characteristic value selected in the correspondence table of FIG. 9 is determined to be the user. If there is no characteristic value with a degree of agreement with the characteristic value obtained in step S805 that is equal to or higher than a predetermined threshold value among the plurality of characteristic values shown in the correspondence table of FIG. 9, it may be determined that a person corresponding to the user has not been registered (unidentifiable). The three-dimensional information on each person is recorded in the memory unit 4 in advance, and the user may be identified by comparing the three-dimensional information obtained in step S805 with the three-dimensional information recorded in the memory unit 4.

Even if the resolution of the eye image obtained by the eye imaging element 17 is relatively low, highly accurate information can be obtained as the abovementioned three-dimensional information. Therefore, according to the present embodiment, it is possible to identify (authenticate) a user (person) with high accuracy with a simple configuration (low-cost configuration).

By using the above-mentioned three-dimensional information, impersonation by using contact lenses, eye video, and the like can be prevented. Here, it is assumed that the user is trying to impersonate a specific person by using a contact lens on which the iris pattern of the specific person is printed. When a user is identified based on a two-dimensional iris pattern (iris pattern), it is determined that the user is a specific person, and impersonation cannot be prevented. Meanwhile, when identifying a user based on three-dimensional information, a large radius of curvature of the contact lens is estimated as the corneal curvature radius R, so that it can be determined that the user is not a specific person and impersonation can be prevented. In addition, since the amount of displacement of a photoreceptor cell, the distance between the pupil center c and the corneal curvature center O (both are estimated values), and the like also depend on the presence or absence of a contact lens, impersonation can also be prevented by using the three-dimensional information of these types. The contact lens user usually registers his/her own information while using the contact lens. Therefore, where the user is a legitimate person, the user can be correctly identified even when contact lenses are used. Further, since the three-dimensional information on the eyeball depends on the shape of the eyeball, the type of contact lens, and the like, it is possible to prevent impersonation of the contact lens user. Even when an eye video is used for impersonation, it is unlikely that the corneal reflex images Pd', Pe', Pf, and Pg' can be reflected in the video, so that impersonation can be prevented.

Whether the three-dimensional information of the eyeball 14 is used for the person identification operation can be verified by, for example, the following methods. In the first method, an identification result obtained when a first pseudo-eyeball is used and the identification result obtained when a second pseudo-eyeball, which has a corneal curvature radius different from that of the first pseudo-eyeball, is used are compared with each other. Where the identification results are different, it can be determined that the information on the corneal curvature radius is used for the person identification operation. In the second method, an identification result obtained when a pseudo-eyeball is oriented in a predetermined direction and an identification result obtained when the pseudo-eyeball is oriented in a direction different from the predetermined direction are compared with each other. Here, orienting the pseudo-eyeball in a predetermined direction or another direction corresponds to causing the user to gaze at the central portion of the screen of the display device 10, which will be described hereinbelow. Where the identification results are different, it can be determined that the information on the amount of displacement of a photoreceptor cell is used for the person identification operation. In the third method, an identification result obtained when the pseudo-eyeball is rotated by a first rotation amount from the state where the pseudo-eyeball is oriented in a predetermined direction and an identification result obtained when the pseudo-eyeball is rotated by a second rotation amount, which is different from the first rotation amount, from the state where the pseudo-eyeball is oriented in the predetermined direction are compared with each other. Here, rotating the pseudo-eyeball from a state in which the pseudo-eyeball is oriented in a predetermined direction corresponds to causing the user to gaze sequentially at a plurality of positions on the screen of the display device 10, which will be described hereinbelow. Where the identification results are different, it can be determined that the information on the distance between the pupil center c and the corneal curvature center O is used for the person identification operation.

Explanation of Three-Dimensional Information Acquisition Operation

The three-dimensional information acquisition operation (operation in step S804) will be described hereinbelow. FIG. 10 is a flowchart of the three-dimensional information acquisition operation. In steps S1001 and S1002, information on the surface shape of the eyeball 14 (surface shape information), specifically, information on the corneal curvature radius R is acquired. In steps S1003 to S1006, information on the internal structure of the eyeball 14 (internal structure information), specifically, information on the amount of displacement of a photoreceptor cell and information on the distance between the pupil center c and the corneal curvature center O are acquired.

Explanation of Acquisition Method of Surface Shape Information

Figure 11A:
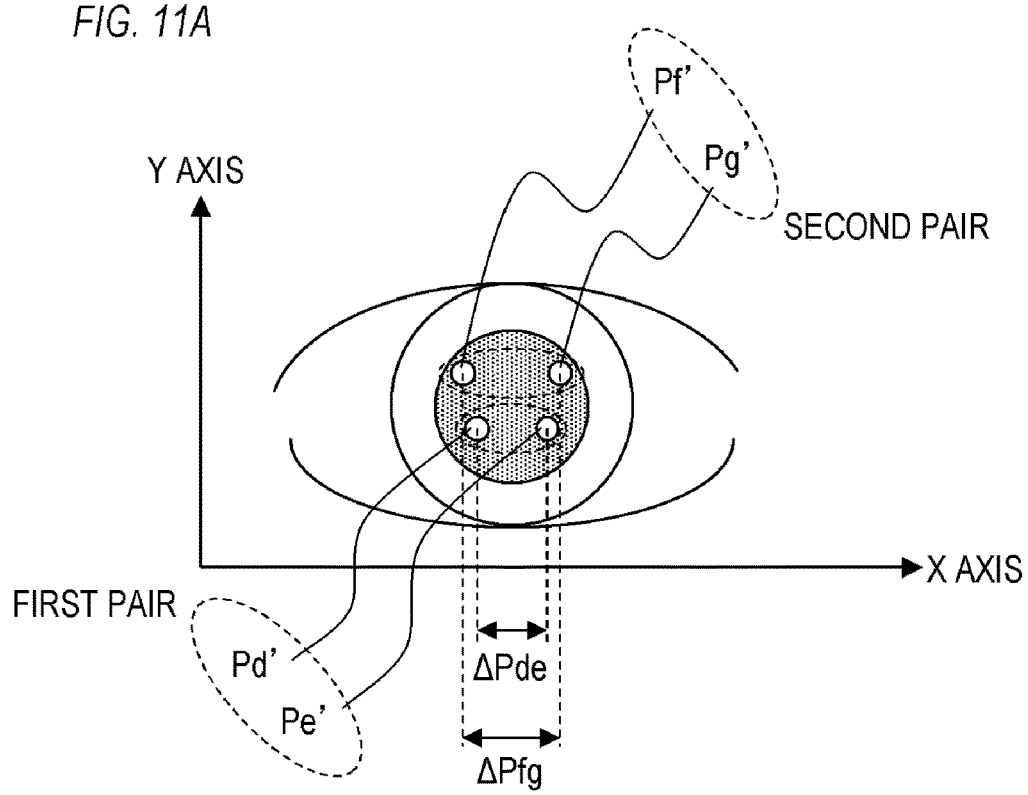
FIGS. 11A and 11B show corneal reflex image pairs according to the present embodiment.

In step S1001 in FIG. 10, the eyeball information acquisition unit 501 calculates the spacing (image spacing) ΔP between the corneal reflex images. Specifically, the eyeball information acquisition unit 501 selects a combination of two corneal reflex images (corneal reflex image pair) from the corneal reflex images Pd', Pe', Pf, and Pg' and calculates the spacing ΔP between the two corneal reflex images. The eyeball information acquisition unit 501 selects two sets of corneal reflex image pairs and calculates two image spacings ΔP corresponding to the two sets of corneal reflex image pairs. For example, as shown in FIG. 11A, the corneal reflex images Pd' and Pe' are selected as the first pair, and the difference between the X-coordinates Xd and Xe (Xe-Xd) of the corneal reflex images Pd' and Pe' is calculated as the spacing ΔPde between the corneal reflex image Pd' and the corneal reflex image Pe'. The corneal reflex images Pf and Pg' are selected as the second pair, and the spacing ΔPfg between the corneal reflex image Pf and the corneal reflex image Pg' is also calculated by the same method as the method for calculating the spacing ΔPde.

Figure 12A:
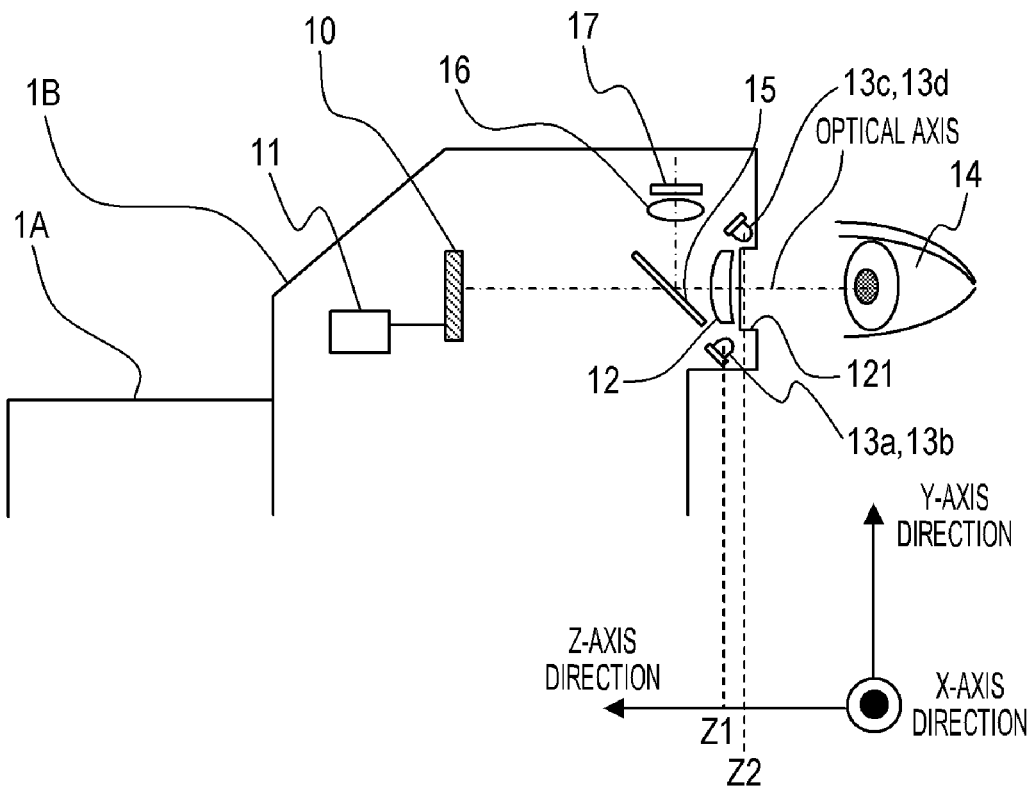
FIGS. 12A and 12B show the arrangement of light sources according to the present embodiment.

The corneal reflex image pair is not limited to the one described above. The position of at least one of the two light sources corresponding to the second pair in the direction parallel to the optical axis for capturing (imaging) the eyeball 14 (direction along the optical axis of the eye imaging element 17 and the light-receiving lens 16; Z-axis direction in FIG. 6) may be different from the positions of the two light sources corresponding to the first pair. In the example shown in FIG. 12A, the Z coordinates (coordinates in the Z-axis direction) of the light sources 13a and 13b forming the corneal reflex images Pd' and Pe' (first pair) are Z1, and the Z coordinates of the light sources 13c and 13d forming the corneal reflex images Pf and Pg' (second pair) are Z2 (≠Z1).

Figure 12B:
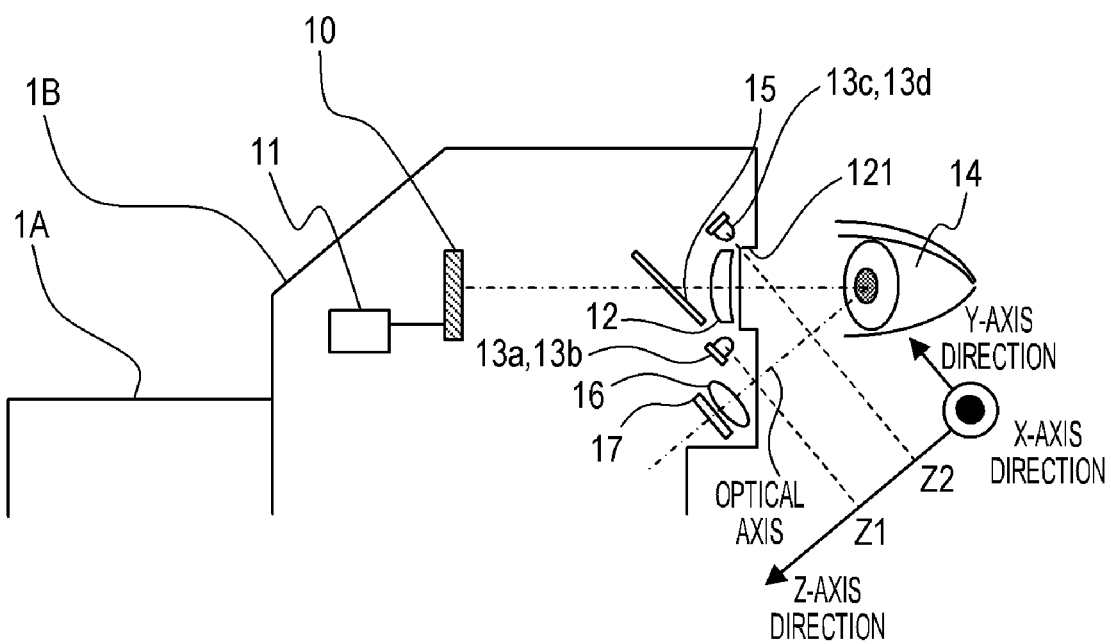

Further, as shown in FIG. 12B, the eye imaging element 17 and the light-receiving lens 16 may be arranged below the eyepiece window frame 121 (viewfinder viewing window). In that case, the direction (Z-axis direction) parallel to the optical axis for capturing (imaging) the eyeball 14 is an oblique direction at an angle to the optical axis of the eyepiece lens 12, rather than a direction parallel to the optical axis of the eyepiece lens 12. In the example shown in FIG. 12B, the positions of the light sources 13a, 13b, 13c, and 13d are the same in the direction parallel to the optical axis of the eyepiece lens 12, but in the Z-axis direction, the positions of the light sources 13a and 13b (Z coordinate Z1) are different from the positions of the light sources 13c and 13d (Z coordinate Z2).

Figure 11B:
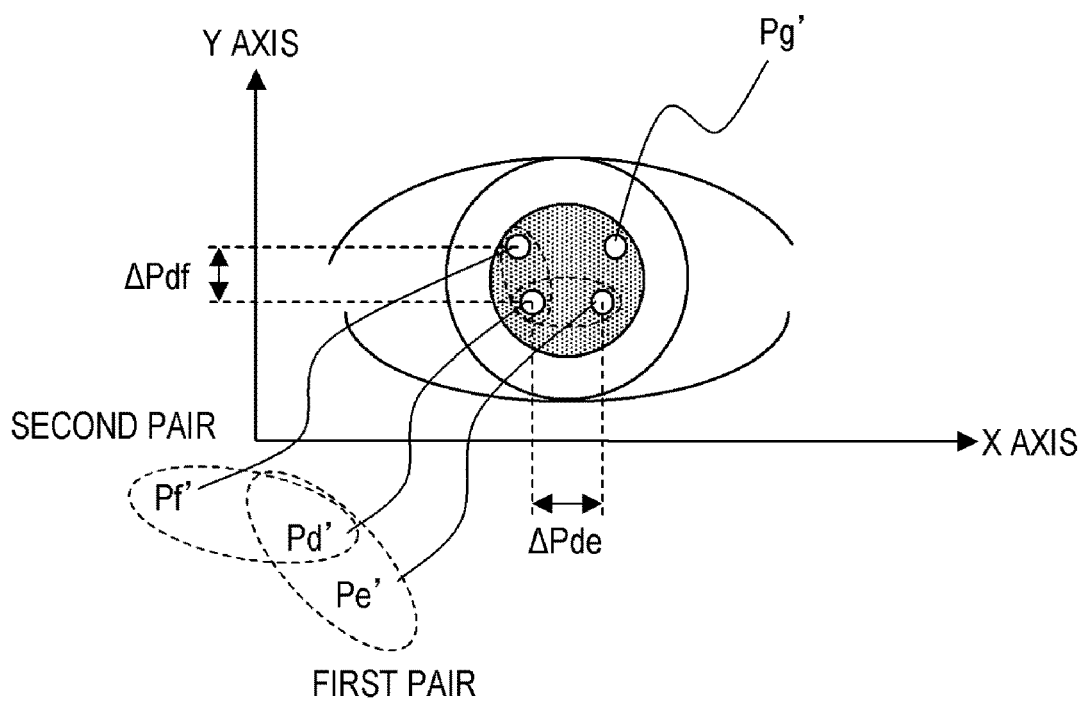

Further, in the example shown in FIG. 11A, the two corneal reflex images in the first pair are different from the two corneal reflex images in the second pair, but the present invention is not limited to such a configuration. As shown in FIG. 11B, any of the two corneal reflex images in the first pair may be the same (common) as any of the two corneal reflex images in the second pair. In the example of FIG. 11B, the corneal reflex images Pd' and Pe' are selected as the first pair, and the corneal reflex images Pf and Pd' are selected as the second pair. In this case, the spacing in the Y-axis direction is calculated as the spacing ΔP between the corneal reflex image Pf and the corneal reflex image Pd'.

Returning to the explanation of FIG. 10, in step S1002, the eyeball information acquisition unit 501 calculates the corneal curvature radius R and the eyeball distance Z on the basis of the image spacing ΔP calculated in step S1001. The eyeball distance Z is, for example, the distance from the light-receiving lens 16 to the eyeball 14 in the direction along the Z axis. In the present embodiment, it is assumed that the corneal curvature radius R and the eyeball distance Z are calculated from the image spacings ΔPde and ΔPfg shown in FIG. 11A. The corneal curvature radius R and the eyeball distance Z may be calculated from the image spacings ΔPde and ΔPdf shown in FIG. 11B.

Figure 13A:
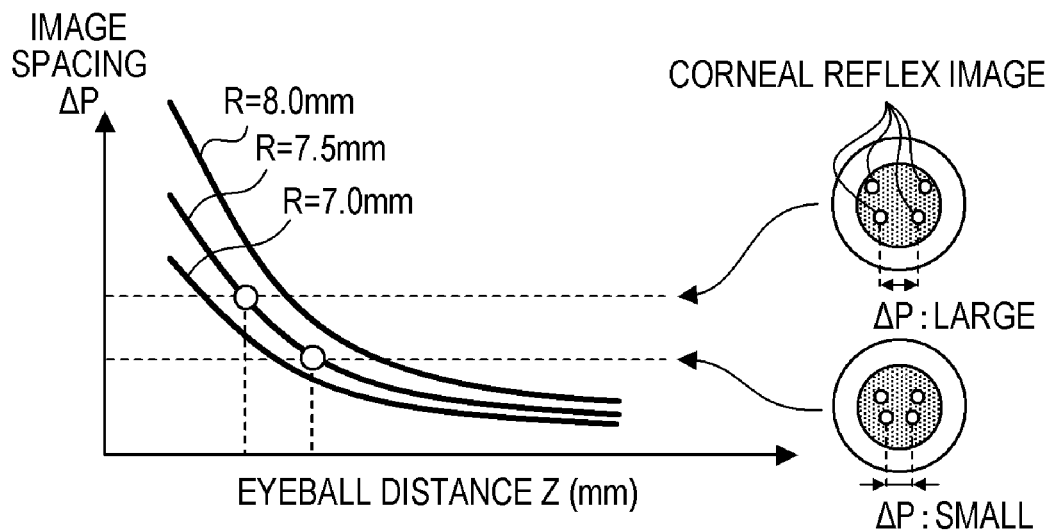
FIGS. 13A and 13B show the relationship between AP, Z, and R according to the present embodiment.
Figure 13B:
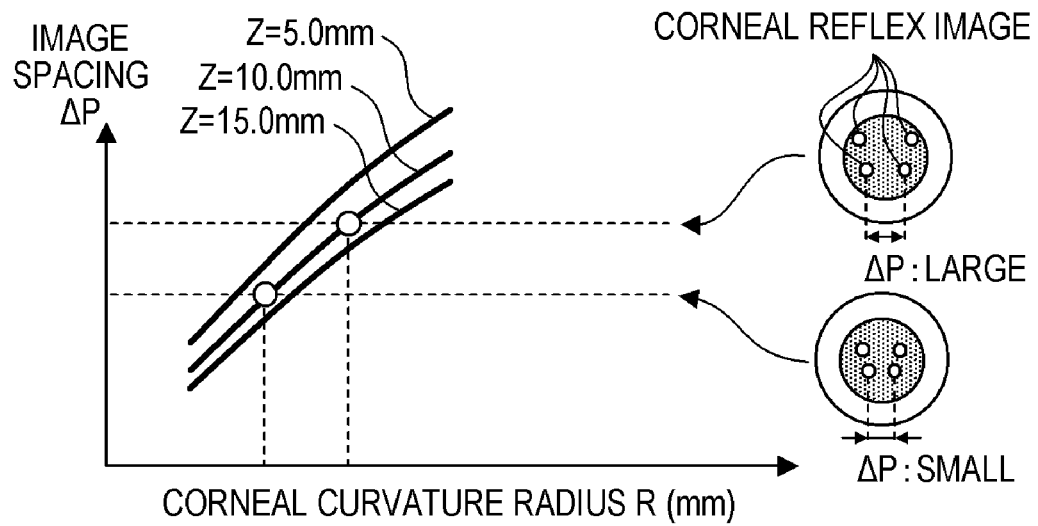

FIGS. 13A and 13B are graphs showing the relationship between the image spacing ΔP, the eyeball distance Z, and the corneal curvature radius R. The graphs of FIG. 13A show the relationship between the image spacing ΔP and the eyeball distance Z, and as the eyeball distance Z increases, the image spacing ΔP decreases non-linearly and monotonically. The relationship (relationship curve) between the image spacing ΔP and the eyeball distance Z differs depending on the corneal curvature radius R, and as the corneal curvature radius R increases, the relationship curve shifts upward on the plane so that the image spacing ΔP increases. The graphs of FIG. 13B show the relationship between the image spacing ΔP and the corneal curvature radius R, and as the corneal curvature radius R increases, the image spacing ΔP monotonically increases while showing some non-linearity. The relationship (relationship curve) between the image spacing ΔP and the corneal curvature radius R differs depending on the eyeball distance Z, and as the eyeball distance Z increases, the relationship curve shifts downward on the plane so that the image spacing ΔP decreases.

Figure 14A:
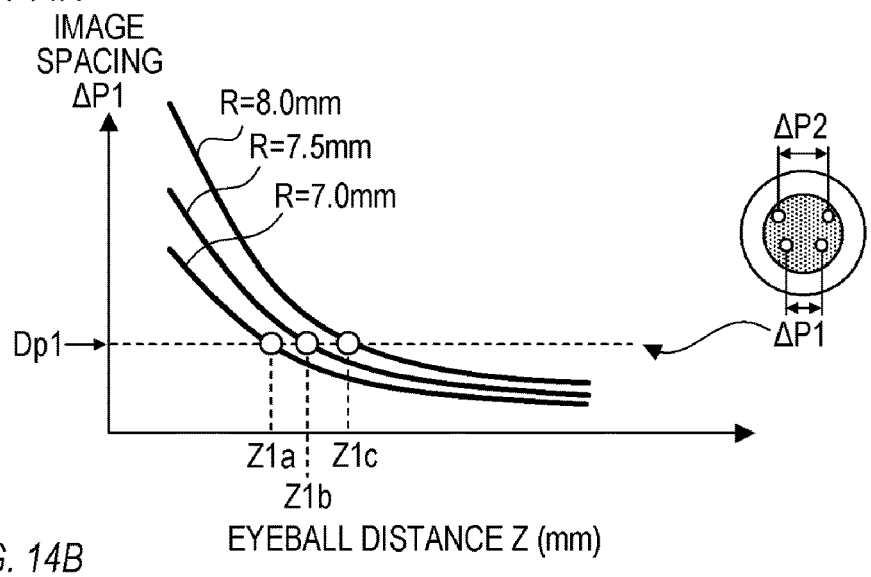
FIGS. 14A to 14C show the relationship between AP, Z, and R according to the present embodiment.
Figure 14B:
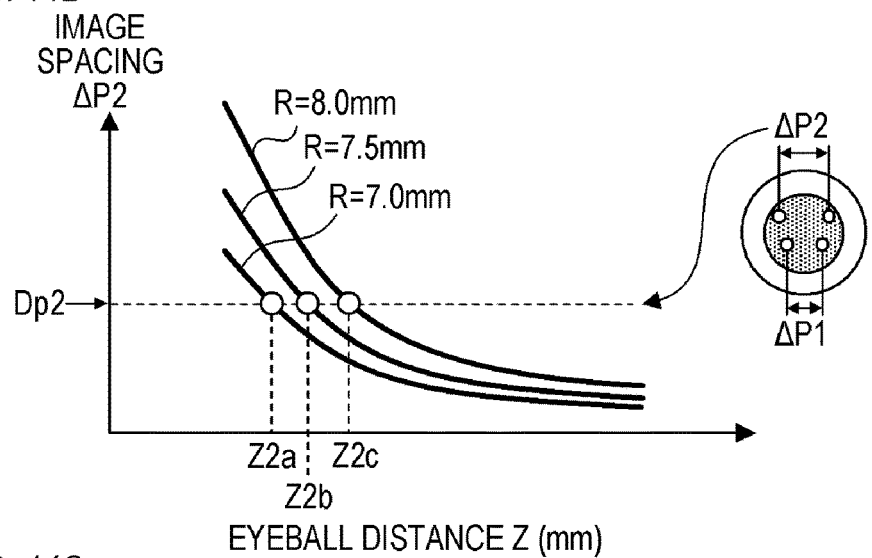

Further, as described above, the Z coordinate Z1 of the light sources 13a and 13b forming the first pair (corneal reflex images Pd' and Pe') are different from the Z coordinate Z2 of the light sources 13c and 13d forming the second pair (corneal reflex images Pf and Pg'). Therefore, the image spacing ΔP1 (=ΔPde) of the first pair and the image spacing ΔP2 (=ΔPfg) of the second pair behave differently with respect to the eyeball distance Z. The behavior thereof is shown in FIGS. 14A and 14B. FIG. 14A is a graph showing the relationship between the image spacing ΔP1 of the first pair and the eyeball distance Z, and FIG. 14B is a graph showing the relationship between the image spacing ΔP2 of the second pair and the eyeball distance Z. Both the image spacing ΔP1 and the image spacing ΔP2 decrease non-linearly and monotonically with the increase in the eyeball distance Z, but for the same eyeball distance Z, the image spacing ΔP2 in FIG. 14B is larger than the image spacing ΔP1 in FIG. 14A.

The eyeball information acquisition unit 501 calculates the user's corneal curvature radius R and the eyeball distance Z in consideration of the behavior of the image spacing ΔP1 of the first pair and the behavior of the image spacing ΔP2 of the second pair, which are different from each other. Here, it is assumed that the eye image of a user with a corneal curvature radius R=Rc is captured (imaged) at an eyeball distance Z=Zc, and an image spacing ΔP1=Dp1 of the first pair and an image spacing ΔP2=Dp2 of the second pair are obtained. The eyeball information acquisition unit 501 calculates (estimates) the user's corneal curvature radius Rc and the eyeball distance Zc on the basis of the image spacing ΔP1=Dp1 and the image spacing ΔP2=Dp2.

As shown in FIG. 14A, a combination of R=7.0 mm and Z=Z1a, a combination of R=7.5 mm and Z=Z1b, and a combination of R=8.0 mm and Z=Z1c are combinations of the corneal curvature radius R and the eyeball distance Z for which the image spacing ΔP1=Dp1. Therefore, the corneal curvature radius R and the eyeball distance Z cannot be uniquely determined only from the image spacing ΔP1=Dp1.

Therefore, the image spacing ΔP2=Dp2 is additionally used. A combination of R=7.0 mm and Z=Z2a, a combination of R=7.5 mm and Z=Z2b, and a combination of R=8.0 mm and Z=Z2c are combinations of the corneal curvature radius R and the eyeball distance Z for which the image spacing ΔP2=Dp2.

Figure 14C:
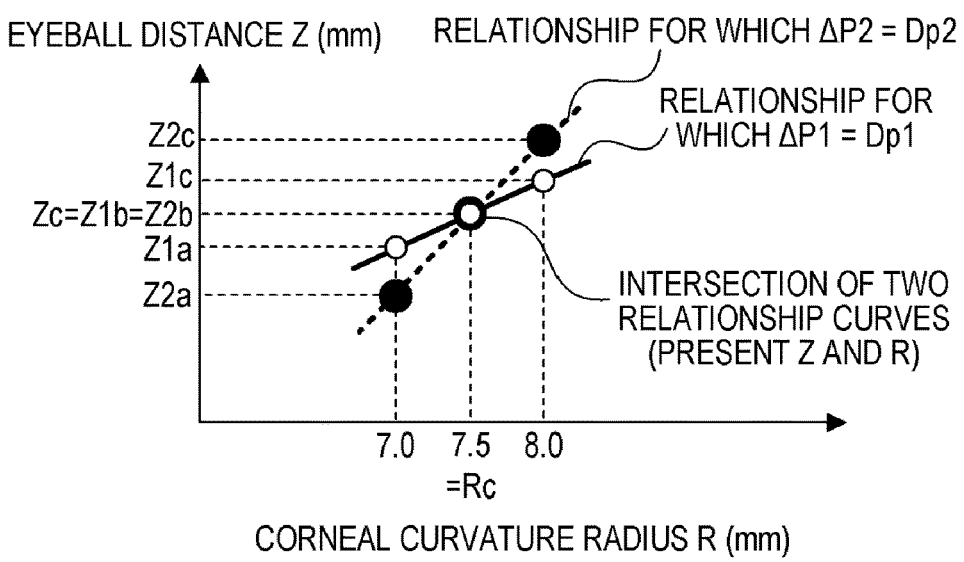

FIG. 14C is a graph which shows the relationship between the corneal curvature radius R and the eyeball distance Z for which the image spacing ΔP1=Dp1 (first relationship curve) and the relationship between the corneal curvature radius R and the eyeball distance Z for which the image spacing ΔP2=Dp2 (second relationship curve). Both the image spacing ΔP1=Dp1 and the image spacing ΔP2=Dp2 are values calculated under the same corneal curvature radius R=Rc and the same eyeball distance Z=Zc. Therefore, the combination of the corneal curvature radius R and the eyeball distance Z that is common to the first relationship curve and the second relationship curve is the combination of the user's corneal curvature radius Rc and the eyeball distance Zc. Therefore, the eyeball information acquisition unit 501 can perform unique determination (estimation) by setting the corneal curvature radius R at the intersection of the first relationship curve and the second relationship curve as the user's corneal curvature radius Rc and setting the eyeball distance Z at that intersection as the user's eyeball distance Zc. In the example shown in FIG. 14C, it is determined that the user's corneal curvature radius Rc=7.5 mm and the user's eyeball distance Zc=Z1b=Z2b.

The relationship curve between the corneal curvature radius R and the eyeball distance Z for which a specific image spacing ΔP is obtained, such as the first relationship curve and the second relationship curve shown in FIG. 14C, is determined in advance by actual measurement or simulation, and is recorded as data in the memory unit 4. A plurality of relationship curves corresponding to a plurality of image spacings ΔP is recorded in advance in the memory unit 4. The relationship curve data may be, for example, table data discretely showing the combinations of the corneal curvature radius R and the eyeball distance Z, or parameters such as coefficients of functions (theoretical formula or approximation formula) showing the correspondence relationship between the corneal curvature radius R and the eyeball distance Z. The eyeball information acquisition unit 501 reads out the relationship curve (first relationship curve) corresponding to the image spacing ΔP1 from the memory unit 4 according to the obtained image spacing ΔP1, and reads out the relationship curve (second relationship curve) corresponding to the image spacing ΔP2 from the memory unit 4 according to the obtained image spacing ΔP2. Then, the eyeball information acquisition unit 501 calculates the user's corneal curvature radius Rc and the eyeball distance Zc by calculating the intersection of the first relationship curve and the second relationship curve that have been read out.

Since there are individual differences in the surface shape (corneal curvature radius R) of the eyeball 14 estimated by the method described above, the information on the surface shape can be used as information for identifying the user.

Explanation of Method for Acquiring Internal Structure Information

In step S1003 in FIG. 10, the eyeball information acquisition unit 501 calculates the image formation magnification β of the eyeball image. The image formation magnification β is determined by the position of the eyeball 14 with respect to the light-receiving lens 16 and can be obtained by using the function of the eyeball distance Z calculated in step S1002. For example, the relationship between the image formation magnification β and the eyeball distance Z is determined in advance by performing actual measurement or simulation and is recorded in the memory unit 4 as table data, function parameters, and the like. The eyeball information acquisition unit 501 reads the data relating to the relationship between the image formation magnification β and the eyeball distance Z from the memory unit 4 and acquires the image formation magnification β corresponding to the eyeball distance Z calculated in step S1002 in this relationship.

In step S1004, the eyeball information acquisition unit 501 calculates the rotation angle of the optical axis of the eyeball 14 with respect to the optical axis of the light-receiving lens 16. The X coordinate of the midpoint of the corneal reflex image Pd and the corneal reflex image Pe and the X coordinate of the corneal curvature center O are substantially the same. Therefore, assuming that the standard distance from the corneal curvature center O to the pupil center c is Oc, the rotation angle θx of the eyeball 14 in the Z-X plane (plane perpendicular to the Y axis) can be calculated by the following Equation 1. The rotation angle θy of the eyeball 14 in the Z-Y plane (plane perpendicular to the X axis) is also calculated by the same method as the method for calculating the rotation angle θx.

$$\beta \times Oc = \text{SIN } \theta x \cong \{(Xd+Xe)/2\} - Xc \quad \text{(Equation 1)}$$

In step S1005, the eyeball information acquisition unit 501 estimates the user's viewpoint on the screen of the display device 10 by using the rotation angles θx and θy calculated in step S1004. Assuming that the coordinates (Hx, Hy) of the viewpoint are the coordinates corresponding to the pupil center c, the coordinates (Hx, Hy) of the viewpoint can be calculated by the following Equations 2 and 3.

$$Hx = m \times (Ax \times \theta x \times Bx) \quad \text{(Equation 2)}$$

$$Hy = m \times (Ay \times \theta y \times By) \quad \text{(Equation 3)}$$

The parameter m in Equations 2 and 3 is a constant determined by the configuration of the finder optical system (light-receiving lens 16 and the like) of the camera 1 and is a conversion factor for converting the rotation angles θx and θy into the coordinates corresponding to the pupil center c on the screen of the display device 10. It is assumed that the parameter m is determined in advance and recorded in the memory unit 4. The parameters Ax, Bx, Ay, and By are line-of-sight correction parameters for correcting individual differences in the line of sight, and are acquired by performing calibration (calibration for line-of-sight detection). It is assumed that the parameters Ax, Bx, Ay, and By are stored in the memory unit 4 before the person identification operation is started. The calibration is performed for each person, and the parameters Ax, Bx, Ay, and By are determined for each person and stored in the memory unit 4.

Figure 4B:
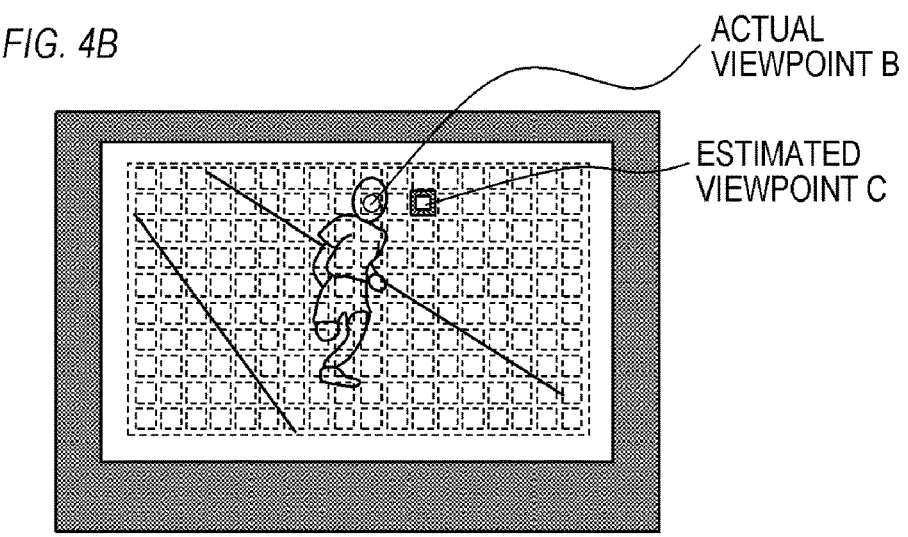

As shown in FIG. 4B, there may be a displacement between the actual viewpoint B and the estimated viewpoint C due to factors such as individual differences in the shape and structure of the human eyeball. In FIG. 4B, the user is gazing at a person, but the camera 1 erroneously presumes that the background is being gazed at, and in this state, the focus detection and focus adjustment based on the viewpoint cannot be performed properly. By using values suitable for the user as the parameters Ax, Ay, Bx, and By, it is possible to reduce the displacement of the viewpoint such as shown in FIG. 4B.

It is also possible to perform only the line-of-sight detection operation included in the person identification operation by performing only the processing of steps S801 to S803 in FIG. 8 and steps S1003 to S1005 in FIG. 10.

Returning to the explanation of FIG. 10, in step S1006, the eyeball information acquisition unit 501 calculates the parameters Ax, Bx, Ay, and By. The shape, structure, etc. of the human eyeball can change with age. Therefore, the CPU 3 may update the parameters Ax, Bx, Ay, and By recorded in the memory unit 4 (parameters of the person determined to be the user in step S806 in FIG. 8) with the parameters Ax, Bx, Ay, and By calculated in step S1006. In that case, the person identification operation can be regarded as including calibration. The eye image used in step S1006 can also be regarded as an image obtained by capturing the eyeball 14 during calibration.

Figure 15:
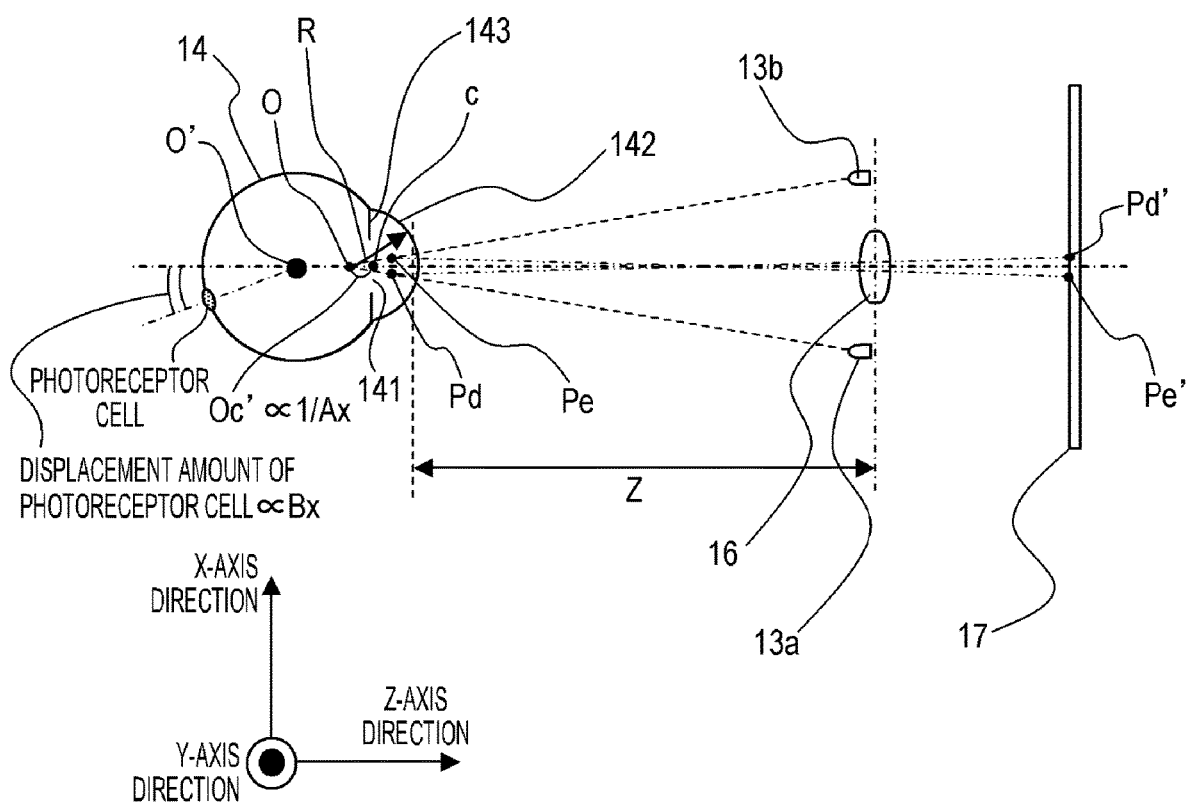
FIG. 15 shows the inside of the eyeball according to the present embodiment.

A method for calculating the parameter Bx will be explained hereinbelow. FIG. 15 shows the inside of the eyeball 14 when the rotation angle θx shown in FIG. 6 is 0 degrees. In FIG. 15, a photoreceptor cell having a role of sensing the light incident on the eyeball 14 and sending a signal to the brain is displaced from the optical axis of the eyeball 14 (the optical axis of the cornea 142 and the pupil 141) indicated by a dot-dash line. Therefore, when the user looks at the central part of the screen of the display device 10, the rotation angle θx is an offset angle corresponding to the displacement amount of the photoreceptor cell from the optical axis of the eyeball 14 and is deviated from 0 degrees. This offset angle (displacement amount of photoreceptor cell) corresponds to the parameter Bx (Bx∝offset angle). Since there are individual differences in the offset angle (displacement amount of the photoreceptor cell) and, therefore, in the appropriate parameter Bx, the parameter Bx can be used as information for identifying the user.

Figure 4C:
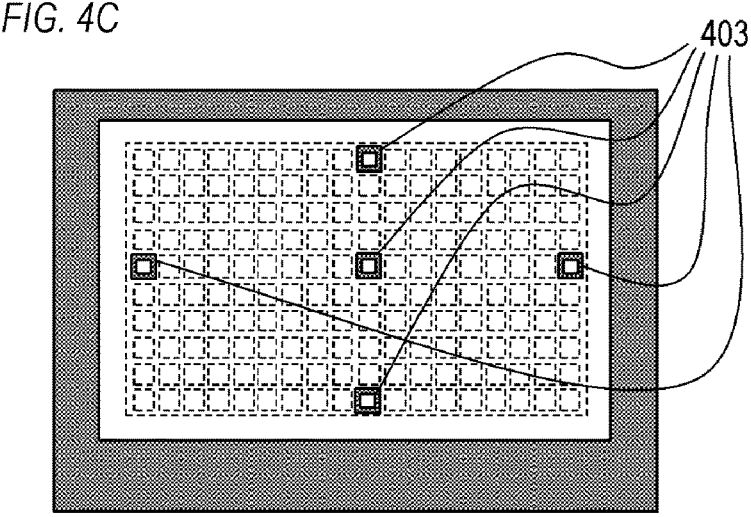

For example, the CPU 3 displays a plurality of indexes 403 shown in FIG. 4C on the screen of the display device 10 and causes the user to gaze at the center of the screen by flashing the index 403 in the center of the screen. A method for causing the user to gaze at the center of the screen is not particularly limited, and for example, only the index 403 in the center of the screen may be displayed. The CPU 3 calculates the rotation angle θx as an offset angle by using the eye image obtained while the user is gazing at the center of the screen and performing the processes of steps S801 to S803 in FIG. 8 and steps S1003 and S1004 in FIG. 10. Then, the CPU 3 calculates the parameter Bx according to the offset amount.

The parameter By is calculated by the same method as the method for calculating the parameter Bx. As information on the displacement amount of the photoreceptor cell, both the parameter Bx and the parameter By may be acquired, or only one of the parameter Bx and the parameter By may be acquired. Information different from the parameter Bx and the parameter By may also be acquired as the information on the displacement amount of the photoreceptor cell.

The calculation method of the parameter Ax will be explained hereinbelow. In Equation 1, the standard distance Oc (constant) from the corneal curvature center O to the pupil center c is used to calculate the angle of rotation θx. However, the actual distance Oc' (variable) from the corneal curvature center O to the pupil center c is not necessarily the same as the distance Oc. The difference between the distance Oc' and the distance Oc is an error of the rotation angle θx calculated by Equation 1. The parameter Ax is for reducing such an error and is inversely proportional to the actual distance Oc' (Ax∝1/Oc'). The value obtained by dividing the standard distance Oc by the parameter Ax is the actual distance Oc'. Since there are individual differences in the actual distance Oc' (distance related to the size of the eyeball 14) from the corneal curvature center O to the pupil center c, and thus in the appropriate parameter Ax, the parameter Ax can be used as information for identifying the user.

For example, the CPU 3 calculates the parameter Ax on the basis of a plurality of eye images obtained by capturing the eyeball 14 a plurality of times while causing the user to gaze sequentially at a plurality of positions on the screen of the display device 10. Specifically, the CPU 3 causes the user to gaze sequentially at two or more indexes 403 having different positions in the horizontal direction among the plurality of indexes 403 in FIG. 4C. The CPU 3 calculates the rotation angle θx for each of the two or more eye images corresponding to the two or more indexes 403. The eye image corresponding to the index 403 is an eye image obtained in a state where the user is caused to gaze at the index 403. The CPU 3 calculates the parameter Ax on the basis of the two or more calculated rotation angles θx. For example, the CPU 3 calculates the parameter Ax so that the sum of the errors of the two or more calculated rotation angles θx (such as the sum of residual squares of the least squares method) is minimized. The parameter Ax may be calculated so that the error of each of the two or more calculated rotation angles θx (the difference between the target rotation angle corresponding to the position of the index 403 and the calculated rotation angle θx) is about the same.

The parameter Ay is calculated by the same method as the method for calculating the parameter Ax. As information on the distance Oc' between the pupil center c and the corneal curvature center O, both the parameter Ax and the parameter Ay may be acquired, or only one of the parameter Ax and the parameter Ay may be acquired. Information different from the parameter Ax and the parameter Ay may also be acquired As the information regarding the distance Oc'.

Explanation of Characteristic Value Acquisition Operation

The characteristic value acquisition operation (operation in step S805) will be explained hereinbelow. The configuration of the characteristic value acquisition unit 502 is not particularly limited, but in the present embodiment, it is assumed to be a CNN (convolutional neural network).

Figure 16:
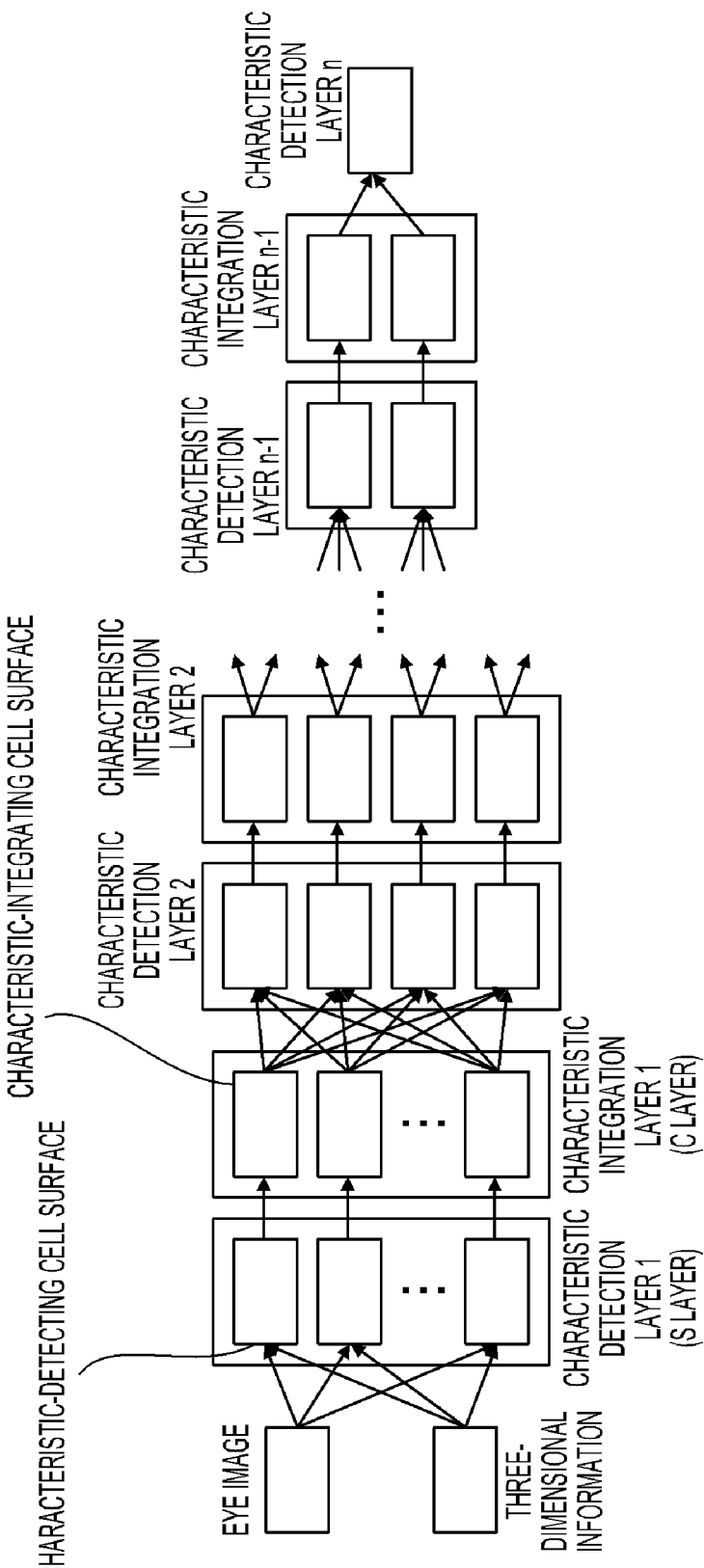
FIG. 16 shows the configuration of a CNN according to the present embodiment.

FIG. 16 shows the configuration of the CNN as the characteristic value acquisition unit 502. Hereinafter, the characteristic value acquisition unit 502 will be referred to as CNN 302. The CNN 302 inputs an eye image and three-dimensional information of the eyeball 14 and outputs a characteristic value. The CNN 302 has two layers called a characteristic detection layer (S layer) and a characteristic integration layer (C layer) as one set and has a plurality of hierarchical sets. In the S layer, the next characteristic is detected based on the characteristic detected in the previous layer. In the very first S layer, the characteristic is detected based on the eye image and the three-dimensional information. The characteristics detected in the S layer are integrated in the C layer of the same hierarchical level and are sent as the detection result in that hierarchical level to the next hierarchical level. The S layer is composed of one or more characteristic-detecting cell surfaces, and different characteristics are detected for each characteristic-detecting cell surface. Further, the C layer is composed of one or more characteristic-integrating cell surfaces and pools the detection results on the characteristic-detecting cell surfaces of the same hierarchical level. Hereinafter, the characteristic-detecting cell surface and the characteristic-integrating cell surface are collectively referred to as a characteristic surface, unless it is necessary to distinguish between the two surfaces. In the present embodiment, it is assumed that the output level, which is the final hierarchical level, has only the S layer and does not have the C layer.

Figure 17:
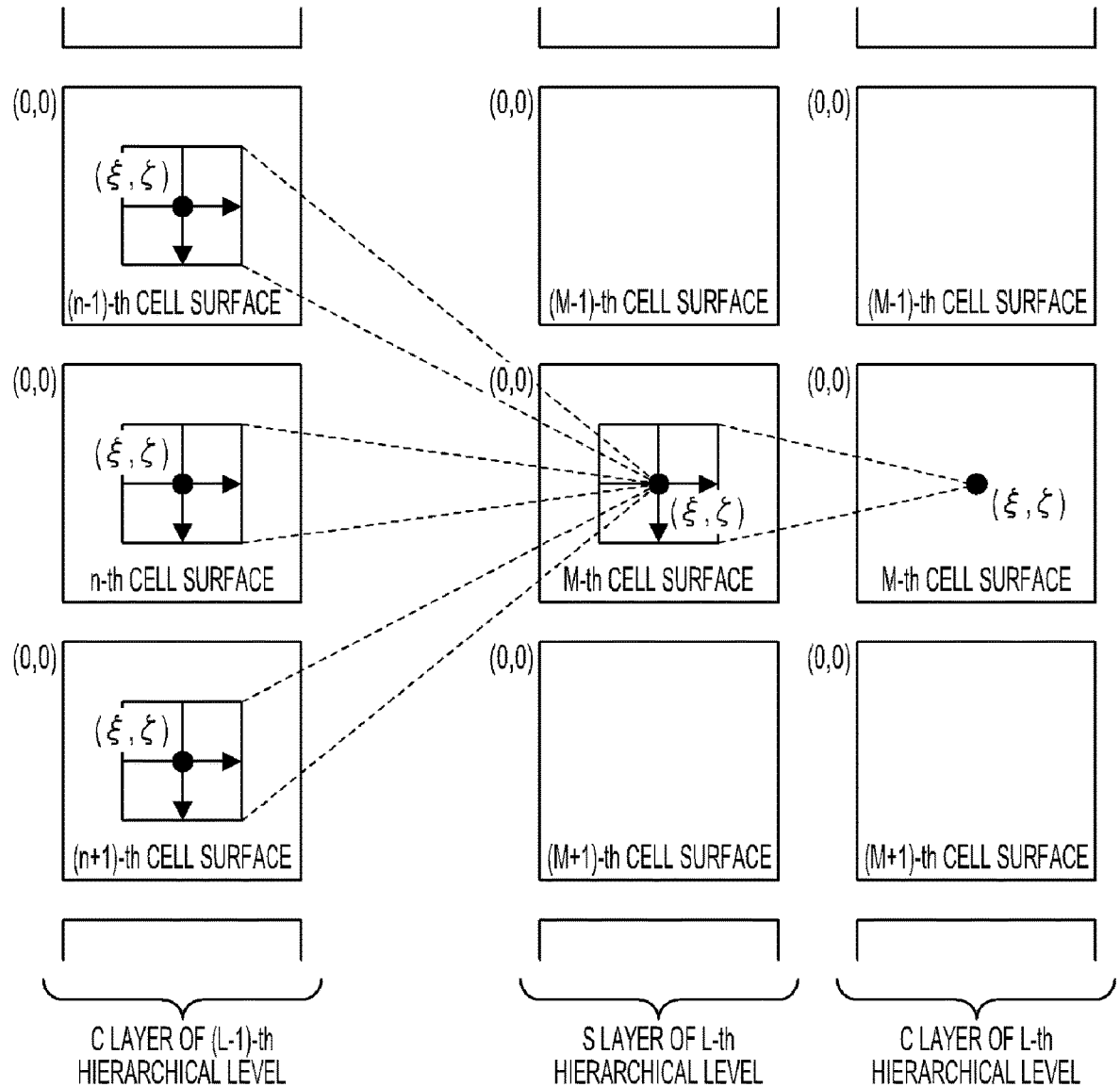
FIG. 17 shows a characteristic detection process and a characteristic integration process according to the present embodiment.

The details of the characteristic detection process on the characteristic-detecting cell surface and the characteristic integration process on the characteristic-integrating cell surface will be described with reference to FIG. 17. The characteristic-detecting cell surface is composed of a plurality of characteristic-detecting neurons, and the characteristic-detecting neurons are connected to the C layer of the previous hierarchical level in a predetermined structure. The characteristic-integrating cell surface is also composed of a plurality of characteristic-integrating neurons, and the characteristic-integrating neurons are connected to the S layer of the same hierarchical level in a predetermined structure. In the M-th cell surface of the S layer of the L-th hierarchical level, the output value of the characteristic-detecting neuron at a position $(\xi, \zeta)$ is represented by $y_M^{LS}(\xi, \zeta)$, and in the M-th cell surface of the C layer of the L-th hierarchical level, the output value of the characteristic-integrating neuron at a position $(\xi, \zeta)$ is represented by $y_M^{LC}(\xi, \zeta)$. Assuming that the coupling coefficients of each neuron are $w_M^{LS}(n, u, v)$ and $w_M^{LC}(u, v)$, each output value can be expressed by the following Equations 4 and 5.

[Math. 1]

$$y_M^{LS}(\xi,\zeta) = f(u_M^{LS}(\xi,\zeta)) = f\{\Sigma_{n,u,v} w_M^{LS}(n,u,v) \cdot y_n^{L-1C}(\xi+u,\zeta+v)\} \quad \text{(Equation 4)}$$

[Math. 2]

$$y_M^{LC}(\xi,\zeta) = u_M^{LC}(\xi,\zeta) w_M^{LC}(u,v) \cdot y_M^{LS}(\xi+u,\zeta+v) \quad \text{(Equation 5)}$$

In Equation 4, f is an activation function, which may be a sigmoid function such as a logistic function or a hyperbolic tangent function, and may be, for example, a tanh function. $u_M^{LS}(\xi, \zeta)$ is the internal state of the characteristic-detecting neuron at the position $(\xi, \zeta)$ on the M-th cell surface of the S layer of the L-th hierarchical level. In Equation 5, a simple linear sum is calculated without using the activation function. When the activation function is not used as in Equation 5, the internal state $u_M^{LC}(\xi, \zeta)$ and the output value $y_M^{LC}(\xi, \zeta)$ of the neuron are equal to each other. Further, $y_n^{L-1C}(\xi+u, \zeta+v)$ in Equation 4 and $y_M^{LS}(\xi+u, \zeta+v)$ in Equation 5 are called the coupling destination output value of the characteristic-detecting neuron and the coupling destination output value of the characteristic-integrating neuron, respectively.

$\xi, \zeta, u, v$, and n in Equations 4 and 5 will be described hereinbelow. The position $(\xi, \zeta)$ corresponds to the position coordinates in the input image. For example, when $y_M^{LS}(\xi, \zeta)$ has a high output value, it means that there is a high possibility that a characteristic to be detected on the M-th cell surface of the S layer of the L-th hierarchical level will be present at the pixel position $(\xi, \zeta)$ of the input image. In Equation 4, n means the n-th cell surface of the C layer of the (L−1)-th hierarchical level and is called an integration destination characteristic number. Basically, the product-sum calculation is performed on all the cell surfaces present in the C layer of the (L−1)-th hierarchical level. (u, v) are the relative position coordinates of the coupling coefficient, and the product-sum operation is performed in a finite (u, v) range according to the size of the characteristic to be detected. Such a finite (u, v) range is called a receptive field. Further, the size of the receptive field is hereinafter referred to as the receptive field size and is expressed by the (number of horizontal pixels) x (number of vertical pixels) in the coupled range.

Further, in Equation 4, in the case of L=1, that is, the very first S layer, $y_n^{L-1C}(\xi+u, \zeta+v)$ becomes the input image $y^{in\_image}(\xi+u, \zeta+v)$ or the input position map $y^{in\_posi\_map}(\xi+u, \zeta+v)$. Since the distribution of neurons and pixels is discrete and the coupling destination characteristic numbers are also discrete, $\xi, \zeta, u, v$, and n take discrete values rather than being continuous variables. Here, and (are non-negative integers, n is a natural number, u and v are integers, and all have values in finite ranges.

In Equation 4, $w_M^{LS}(n, u, v)$ is a coupling coefficient distribution for detecting a predetermined characteristic, and by adjusting this coupling coefficient distribution to an appropriate value, it becomes possible to detect the predetermined characteristic.

This adjustment of the coupling coefficient distribution is learning, and in the construction of CNN 302, various test patterns are presented, and the adjustment of the coupling coefficient is performed by repeatedly and gradually modifying the coupling coefficient so that $y_M^{LS}(\xi, \zeta)$ has an appropriate output value.

$w_M^{LC}(u, v)$ in Equation 5 can be expressed as in Equation 6 below by using a two-dimensional Gaussian function.

[Math. 3]

$$w_M^{LC}(u, v) = \frac{1}{2\pi\sigma_{L,M}^2} \cdot \exp\left(-\frac{u^2 + v^2}{2\sigma_{L,M}^2}\right) \quad \text{(Equation 6)}$$

Again, since (u, v) are present as a finite range, the finite range is called the receptive field and the size of the range is called the receptive field size, as in the explanation of the characteristic-detecting neuron. Here, the receptive field size may be set to an appropriate value according to the size of the M-th characteristic of the S-layer of the L-th hierarchical level. In Equation 6, σ is a characteristic size factor and may be set to an appropriate constant according to the receptive field size. Specifically, it is preferable to set a so that the outermost value of the receptive field can be regarded as almost 0.

By performing the above-mentioned calculation in each hierarchical level, the characteristic value to be used for user identification can be obtained in the S layer of the final hierarchical level. The steps leading to user identification may be configured by CNN, and the user identification result may be output from the CNN.

SUMMARY

As described above, according to the present embodiment, the user (person) can be identified (authenticated) with high accuracy with a simple configuration by using the three-dimensional information of the eyeball.

The above embodiment is merely exemplary, and the present invention is also inclusive of configurations obtained by modifying or changing, as appropriate, the configuration of the above embodiment without departing from the gist and scope of the present invention. For example, although an example using four light sources has been described, the number of light sources is not particularly limited and may be more or less than four. When calculating the corneal curvature radius R by the method described above, three or more light sources are required.

Further, although an example in which the present invention is applied to an imaging device (camera) has been described, the present invention can be applied to any device capable of acquiring a user's eye image. The eye imaging element and the light source may be provided separately from the device to which the present invention is applied.

Example of Application to Other Electronic Devices

Figure 18A:
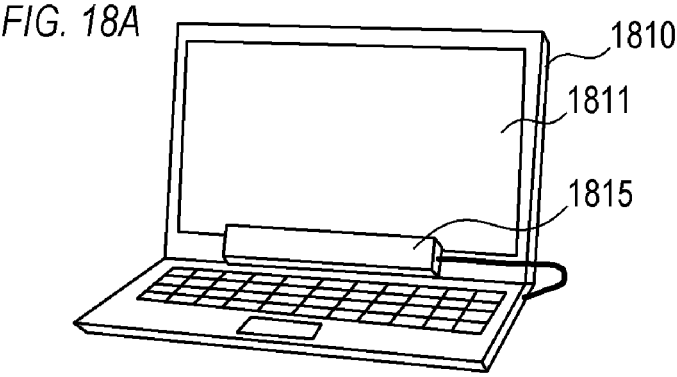
FIGS. 18A to 18C are external views of other electronic devices to which the present invention can be applied.

FIG. 18A is an external view of a notebook personal computer 1810 (notebook PC). In FIG. 18A, an imaging unit 1815 that captures (images) a user viewing a display unit 1811 of the notebook PC 1810 is connected to the notebook PC 1810, and the notebook PC 1810 acquires an imaging result from the imaging unit 1815. The notebook PC 1810 acquires three-dimensional information of the user's eyeball on the basis of the imaging result and identifies the user. The imaging unit 1815 may acquire the three-dimensional information to identify the user and output the identification result to the notebook PC 1810. As described above, the present invention is also applicable to the notebook PC 1810 and the imaging unit 1815.

Figure 18B:
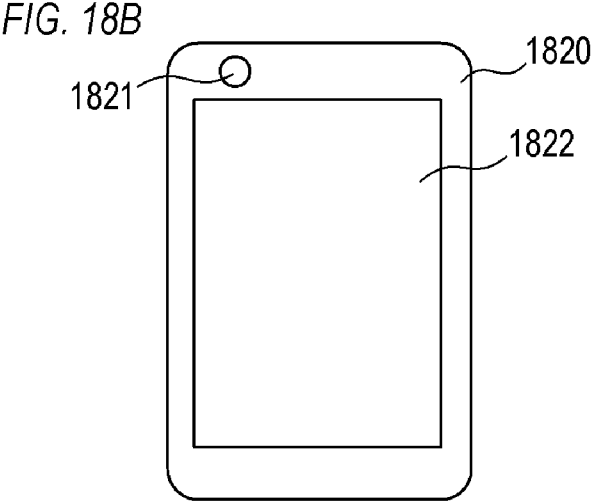

FIG. 18B is an external view of a smartphone 1820. In FIG. 18B, the smartphone 1820 acquires three-dimensional information of the eyeball of a user viewing a display unit 1822 of the smartphone 1820 on the basis of the imaging result of the in-camera 1821 (front camera) and identifies the user. Thus, the present invention is also applicable to the smartphone 1820. Similarly, the present invention is also applicable to various tablet terminals.

Figure 18C:
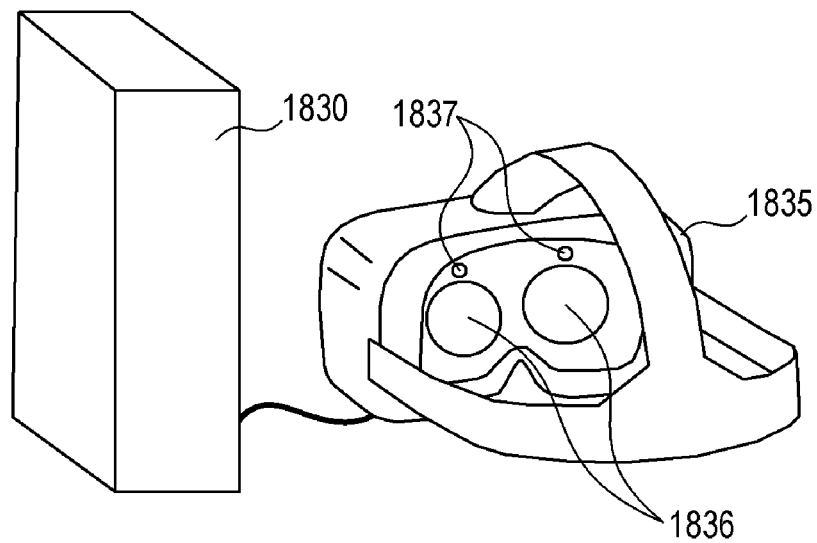

FIG. 18C is an external view of a game machine 1830. In FIG. 18C, a head-mounted display 1835 (HMD) that displays a VR (Virtual Reality) image of a game on a display unit 1836 is connected to the game machine 1830. The HMD 1835 has a camera 1837 that captures (images) an eye of a user wearing the HMD 1835, and the game machine 1830 acquires the imaging result from the HMD 1835. The game machine 1830 acquires three-dimensional information of the user's eyeball on the basis of the imaging result and identifies the user. The HMD 1835 may acquire the three-dimensional information to identify the user and output the identification result to the game machine 1830. Thus, the present invention is also applicable to the game machine 1830 and the HMD 1835. Just as the present invention is applicable when viewing a VR image displayed on an HMD, the present invention is also applicable when viewing an AR (Augmented Reality) image displayed on a lens portion of a spectacle-type wearable terminal or the like. Just as the present invention is applicable to VR and AR techniques, the present invention is also applicable to other xR techniques such as MR (Mixed Reality) technique and SR (Substitutional Reality) technique.

According to the present disclosure, a user (person) can be identified (authenticated) with high accuracy with a simple configuration.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-173758, filed on Oct. 25, 2021, which is hereby incorporated by reference herein in its entirety.

What is claimed is:

1. An identification device comprising at least one memory and at least one processor which function as:
   an image acquisition unit configured to acquire an image obtained by capturing an eyeball of a user;
   an information acquisition unit configured to acquire three-dimensional information of the eyeball, based on the image;
   a characteristic value acquisition unit configured to acquire a characteristic value of the user by inputting the image acquired by the image acquisition unit and the three-dimensional information acquired by the information acquisition unit into a convolutional neural network; and
   an identification unit configured to identify the user, based on the characteristic value, wherein the characteristic value comprises a user-identifying information based on analysis of a surface shape of the user's eyeball or a corneal curvature radius of the user's eyeball by the convolutional neural network.

2. The identification device according to claim 1, wherein the image acquisition unit acquires the image from an image sensor that captures the eyeball.

3. The identification device according to claim 1, wherein the image acquisition unit acquires the image obtained by capturing the eyeball while illuminating the eyeball with a plurality of light sources; and
   the information acquisition unit acquires the three-dimensional information, based on corneal reflex images of the plurality of light sources.

4. The identification device according to claim 3, further comprising
   the plurality of light sources.

5. The identification device according to claim 1, wherein the three-dimensional information includes information relating to a surface shape of the eyeball.

6. The identification device according to claim 5, wherein the information relating to the surface shape includes information relating to a corneal curvature radius of the eyeball.

7. The identification device according to claim 6, wherein
the image acquisition unit acquires the image obtained by capturing the eyeball while illuminating the eyeball with three or more light sources;
the information acquisition unit acquires information relating to the corneal curvature radius, based on the corneal reflex images of the three or more light sources; and
a position of at least one of the three or more light sources is different from positions of other light sources of the three or more light sources in a direction parallel to an optical axis for capturing the eyeball.

8. The identification device according to claim 1, wherein
the three-dimensional information includes information relating to an internal structure of the eyeball.

9. The identification device according to claim 8, wherein
the information relating to the internal structure includes information relating to an amount of displacement of a photoreceptor cell of the eyeball from an optical axis passing through a pupil center of the eyeball and a corneal curvature center of the eyeball.

10. The identification device according to claim 9, wherein
the image acquisition unit acquires the image obtained by capturing the eyeball of the user who looks at a display surface, and
the information acquisition unit acquires information relating to the amount of displacement, based on an image obtained by capturing the eyeball in a state where the user is caused to gaze at a central portion of the display surface.

11. The identification device according to claim 8, wherein
the information relating to the internal structure includes information relating to a distance between a pupil center of the eyeball and a corneal curvature center of the eyeball.

12. The identification device according to claim 11, wherein
the image acquisition unit acquires the image obtained by capturing the eyeball of the user who looks at a display surface; and
the information acquisition unit acquires information relating to the distance, based on a plurality of images obtained by capturing the eyeball a plurality of times while causing the user to gaze sequentially at a plurality of positions on the display surface.

13. The identification device according to claim 8, wherein
the image is also used for line-of-sight detection to obtain information relating to a line of sight of the user; and
the information acquisition unit acquires information relating to the internal structure of the eyeball, based on an image obtained by capturing the eyeball during calibration for obtaining a parameter used for the line-of-sight detection.

14. The identification device according to claim 13, wherein
the information relating to the internal structure of the eyeball is the parameter to be used for the line-of-sight detection.

15. The identification device according to claim 1, wherein
an identification result differs between a case where a first pseudo-eyeball is used and a case where a second pseudo-eyeball, which differs in a curvature radius of a corneal portion from the first pseudo-eyeball, is used.

16. The identification device according to claim 1, wherein
an image acquisition unit configured to acquire an image obtained by imaging an eyeball of a user; and
an identification unit configured to identify the user, based on the image, wherein
an identification result differs between a case where a pseudo-eyeball is oriented in a predetermined direction and a case where the pseudo-eyeball is oriented in a direction different from the predetermined direction.

17. The identification device according to claim 1, wherein
an identification result differs between a case where a pseudo-eyeball is rotated by a first rotation amount from a state where the pseudo-eyeball is oriented in a predetermined direction and a case where the pseudo-eyeball is rotated by a second rotation amount, which is different from the first rotation amount, from the state where the pseudo-eyeball is oriented in the predetermined direction.

18. A control method of an identification device, comprising:
acquiring an image obtained by capturing an eyeball of a user;
acquiring three-dimensional information of the eyeball, based on the image;
acquiring a characteristic value of the user by inputting the image and the three-dimensional information into a convolutional neural network; and
identifying the user, based on the characteristic value, wherein the characteristic value comprises a user-identifying information based on analysis of a surface shape of the user's eyeball or a corneal curvature radius of the user's eyeball by the convolutional neural network.

19. A non-transitory computer readable medium that stores a program, wherein the program causes a computer to execute a control method of an identification device, the control method comprising:
acquiring an image obtained by capturing an eyeball of a user;
acquiring three-dimensional information of the eyeball, based on the image;
acquiring a characteristic value of the user by inputting the image and the three-dimensional information into a convolutional neural network; and
identifying the user, based on the characteristic value, wherein the characteristic value comprises a user-identifying information based on analysis of a surface shape of the user's eyeball or a corneal curvature radius of the user's eyeball by the convolutional neural network.

* * * * *